(12) United States Patent
Itamoto et al.

(10) Patent No.: US 10,246,125 B2
(45) Date of Patent: Apr. 2, 2019

(54) STEERING CONTROL DEVICE

(71) Applicant: JTEKT CORPORATION, Osaka-shi, Osaka (JP)

(72) Inventors: Hidenori Itamoto, Tajimi (JP); Naoki Yamano, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 161 days.

(21) Appl. No.: 15/611,269

(22) Filed: Jun. 1, 2017

(65) Prior Publication Data
US 2017/0355394 A1 Dec. 14, 2017

(30) Foreign Application Priority Data

Jun. 9, 2016 (JP) ................. 2016-115551

(51) Int. Cl.
*B62D 11/00* (2006.01)
*B62D 5/04* (2006.01)

(52) U.S. Cl.
CPC ......... *B62D 5/0463* (2013.01); *B62D 5/0421* (2013.01); *B62D 5/0442* (2013.01); *B62D 5/0481* (2013.01); *B62D 5/0484* (2013.01); *B62D 5/0493* (2013.01)

(58) Field of Classification Search
None
See application file for complete search history.

(56) References Cited

U.S. PATENT DOCUMENTS

| 2011/0118937 A1 | 5/2011 | Kariatsumari et al. |
| 2012/0211299 A1 | 8/2012 | Yanai |
| 2013/0013154 A1 | 1/2013 | Aoki |
| 2017/0113715 A1 | 4/2017 | Yamano et al. |

FOREIGN PATENT DOCUMENTS

| EP | 2 216 895 A2 | 8/2010 |
| JP | 2011-097763 A | 5/2011 |
| JP | 5440845 B2 | 3/2014 |
| JP | 2017-087764 A | 5/2017 |

OTHER PUBLICATIONS

Jun. 19, 2017 Extended Search Report issued in European Patent Application No. 16194034.1.
Oct. 13, 2016 U.S. Appl. No. 15/292,717.
U.S. Appl. No. 15/292,717, filed Oct. 13, 2016 in the name of Yamano et al.
Dec. 7, 2017 Extended Search Report issued in European Patent Application No. 17174745.4.

*Primary Examiner* — Bhavesh V Amin
(74) *Attorney, Agent, or Firm* — Oliff PLC

(57) ABSTRACT

There is provided a steering control device that can control even when a systematic error has occurred. An update amount calculation processing circuit manipulates a control angle in accordance with an update amount in order to control steering torque, which is obtained by subjecting the magnitude of steering torque to a decrease correction by a threshold, to target torque through feedback control. The control angle is used to convert a current command value to a value in a fixed coordinate system or the like. The update amount is subjected to a guarding process in accordance with the steering torque by a torque-based guarding processing circuit, and determined as a final update amount for the control angle. The torque-based guarding processing circuit performs the guarding process on the update amount such that the update amount is in an allowable range that matches the steering torque.

8 Claims, 13 Drawing Sheets

STEERING CONTROL DEVICE

INCORPORATION BY REFERENCE

The disclosure of Japanese Patent Application No. 2016-115551 filed on Jun. 9, 2016 including the specification, drawings and abstract, is incorporated herein by reference in its entirety.

BACKGROUND OF THE INVENTION

1. Field of the Invention

The present invention relates to a steering control device that controls a steering device that assists steering of a vehicle.

2. Description of the Related Art

Japanese Patent No. 5440845, for example, describes a control device that manipulates a control angle to be input to a current feedback controller that causes a synchronous motor to generate assist torque in order to control a detected value of steering torque to target torque through feedback control. The control device performs torque feedback control as sensorless control for the synchronous motor, defines the coordinate axes of a coordinate system rotated by the control angle as γ axis and δ axis, determines a command current value for γ axis as a value that is larger than zero, and determines a command current value for δ axis as zero. Consequently, a q-axis current flows in accordance with the amount of deviation between γ axis and d axis, and the q-axis current generates torque of the synchronous motor. The amount of deviation between γ axis and d axis can be manipulated by the control angle. Thus, the amount of deviation between γ axis and d axis can be manipulated, and hence torque of the synchronous motor can be controlled, by manipulating the control angle through the torque feedback control.

It should be noted, however, that torque of the synchronous motor cannot be controlled appropriately in the case where a so-called systematic error such as an abnormality in parameter of a controller for the torque feedback control and a logic abnormality, for example, has occurred.

SUMMARY OF THE INVENTION

It is an object of the present invention to provide a steering control device that allows execution of assist control even when a systematic error has occurred in a controller that manipulates a control angle to be input to a current feedback controller in order to control a detected value of steering torque to target torque through feedback control.

An aspect of the present invention provides a steering control device that controls a steering device that assists steering of a vehicle and that includes a synchronous motor that generates assist torque and a power conversion circuit that applies a voltage to the synchronous motor, the steering control device including:

a current control processing circuit that manipulates the voltage, which is applied to the synchronous motor by the power conversion circuit, in order to control a current that flows through the synchronous motor to a command value;

a control angle manipulation processing circuit that manipulates a control angle that determines a phase of the command value in order to control a detected value of steering torque, which is torque input to a steering member, to target torque through feedback control; and a torque-based guarding processing circuit that performs a guarding process such that an update amount for the control angle determined by the control angle manipulation processing circuit is equal to or less than a torque-based upper-limit guard value, which is an upper-limit guard value with a magnitude of the update amount in a rotational direction of the synchronous motor that matches the detected value, and equal to or more than a torque-based lower-limit guard value, which is a lower-limit guard value with the magnitude of the update amount in the rotational direction of the synchronous motor that matches the detected value, in which the torque-based guarding processing circuit includes a contraction processing circuit that gradually contracts an allowable range of the update amount determined by the torque-based upper-limit guard value and the torque-based lower-limit guard value using, as a condition, at least one of a state in which the magnitude of the update amount is more than the torque-based upper-limit guard value and a state in which the magnitude of the update amount is less than the torque-based lower-limit guard value.

The assist torque is intended to assist the steering torque, and therefore has a correlation with the steering torque. In addition, the assist torque is determined in accordance with the phase of the current. In particular, the phase of the current is determined in accordance with the sign of the assist torque. Therefore, the sign of the update amount for the control angle which determines the phase of the current is determined in accordance with the detected value of the steering torque. In the configuration described above, in view of this respect, the guarding process is performed such that the update amount for the control angle is equal to or less than the torque-based upper-limit guard value which matches the detected value of the steering torque and equal to or more than the torque-based lower-limit guard value which matches the detected value of the steering torque. Consequently, reflection of a deviating update amount in the update of the actual control angle is suppressed in the case where the update amount determined by the control angle manipulation processing circuit significantly deviates from an appropriate value. It is possible to restrict the update amount for the control angle to a more appropriate value for executing the assist control by gradually contracting the allowable range of the update amount which is determined by the torque-based upper-limit guard value and the torque-based lower-limit guard value. Therefore, it is possible to execute assist control even when a systematic error has occurred in a controller that manipulates a control angle to be input to a current feedback controller in order to control a detected value of steering torque to target torque through feedback control.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
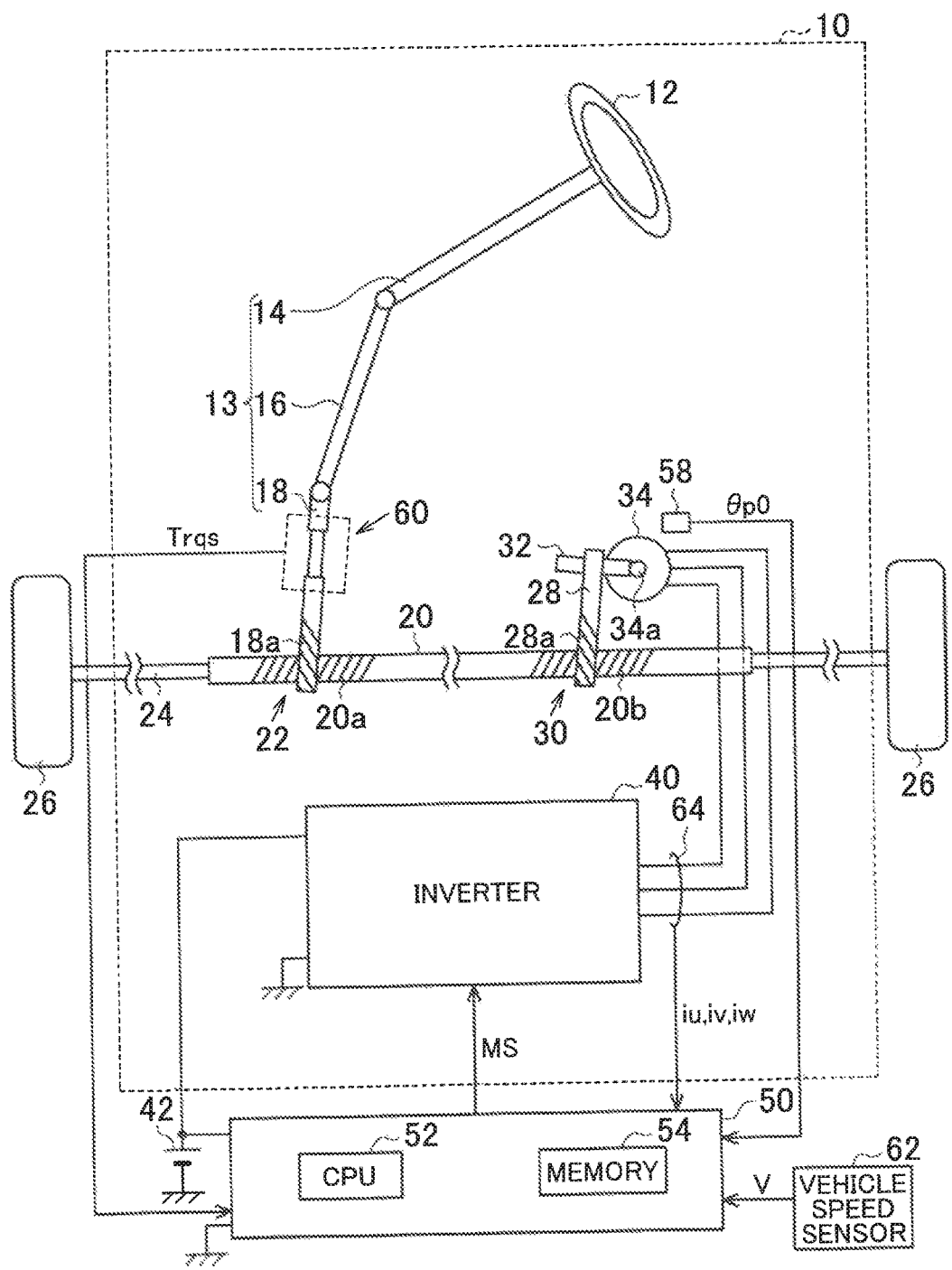
FIG. 1 is a diagram of a steering system that includes a steering control device according to a first embodiment.

A steering control device according to a first embodiment of the present invention will be described below with reference to the drawings. In a steering device 10 according to the present embodiment, as illustrated in FIG. 1, a steering wheel (steering member 12) is fixed to a steering shaft 13, and a rack shaft 20 is reciprocated in the axial direction in response to rotation of the steering shaft 13. The steering shaft 13 is constituted by coupling a column shaft 14, an intermediate shaft 16, and a pinion shaft 18 in this order from the steering member 12 side.

The pinion shaft 18 is disposed so as to be able to transfer power to the rack shaft 20. Particularly, the rack shaft 20 and the pinion shaft 18 are disposed with a predetermined crossing angle, and first rack teeth 20a formed on the rack shaft 20 and pinion teeth 18a formed on the pinion shaft 18 are meshed with each other to constitute a first rack-and-pinion mechanism 22. In addition, tie rods 24 are coupled to opposite ends of the rack shaft 20, and the distal ends of the tie rods 24 are coupled to knuckles (not illustrated) to which steered wheels 26 are assembled. Thus, the steered angle of the steered wheels 26, that is, the travel direction of the vehicle, is changed when rotation of the steering shaft 13 caused along with operation of the steering member 12 is converted into axial displacement of the rack shaft 20 by the first rack-and-pinion mechanism 22 and the axial displacement is transferred to the knuckles via the tie rods 24.

The rack shaft 20 is disposed at a predetermined crossing angle with respect to a pinion shaft 28, and second rack teeth 20b formed on the rack shaft 20 and pinion teeth 28a formed on the pinion shaft 28 are meshed with each other to constitute a second rack-and-pinion mechanism 30. The pinion shaft 28 is connected to a rotary shaft 34a of a synchronous motor 34 via a speed reduction mechanism 32 such as a worm and a wheel. The synchronous motor 34 is a three-phase surface permanent magnet synchronous motor (SPMSM).

The synchronous motor 34 is connected to a battery 42 via an inverter 40. The inverter 40 is a power conversion circuit that converts a DC voltage of the battery 42 into an AC voltage to apply the AC voltage to the synchronous motor 34.

The steering control device (control device 50) includes a central processing unit (CPU 52) and a memory 54. The control device 50 controls torque of the synchronous motor 34, and executes assist control in which operation of the steering member 12 is assisted by operating the inverter 40. In this event, the control device 50 references values detected by various sensors. Examples of such sensors include a rotational angle sensor 58 that detects a rotational angle θp0 of the rotary shaft 34a of the synchronous motor 34, a torque sensor 60 that detects torque (steering torque Trqs) applied to the steering shaft 13, and a vehicle speed sensor 62 that detects the travel speed (vehicle speed V) of the vehicle. Further, the control device 50 acquires values detected by a current sensor 64 that detects line currents (currents iu, iv, and iw) between the inverter 40 and the synchronous motor 34.

Figure 2:
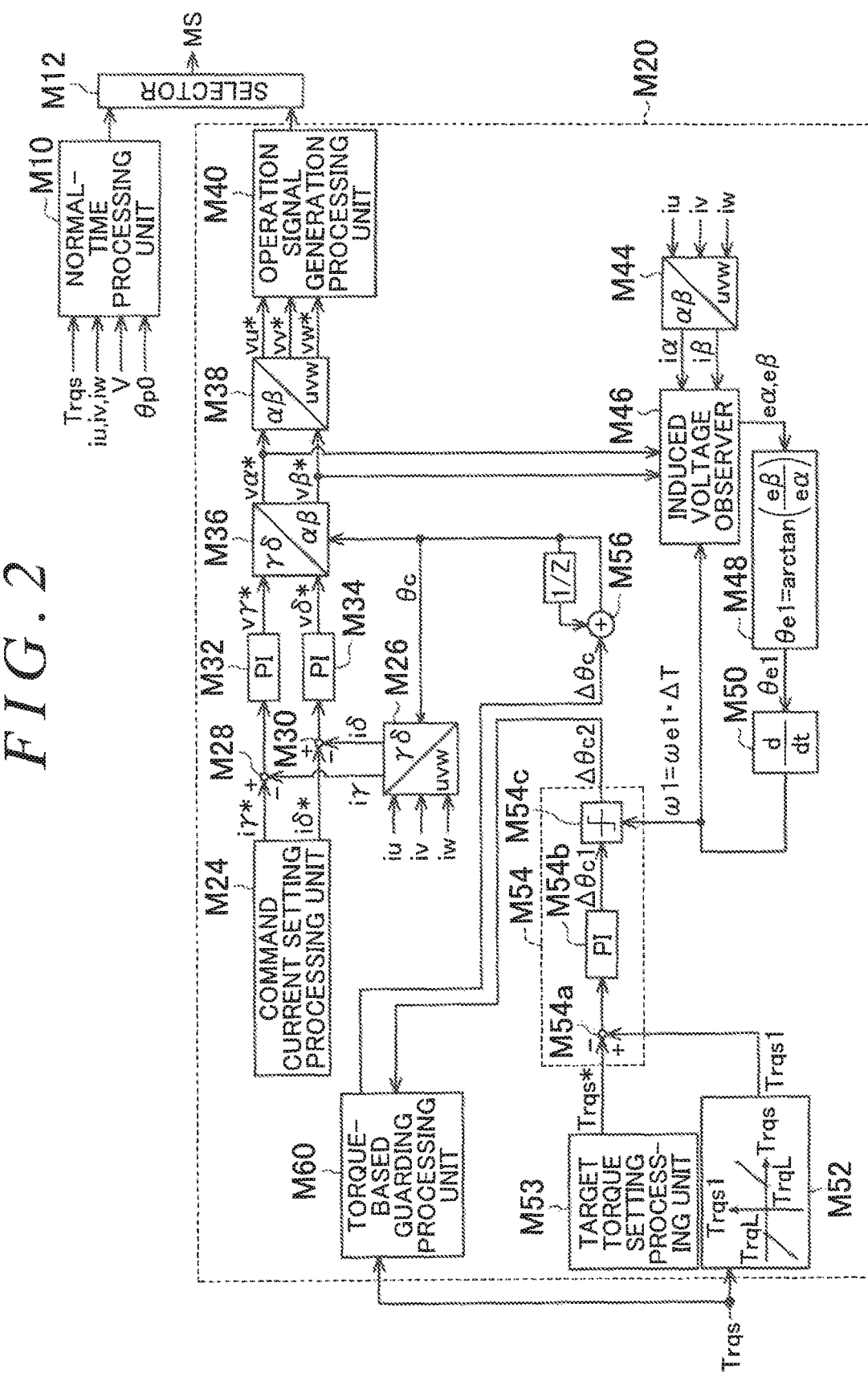
FIG. 2 is a block diagram illustrating a part of a process implemented by a central processing unit (CPU) according to the first embodiment.

FIG. 2 illustrates a part of a process executed by the control device 50. FIG. 2 illustrates several processes implemented when the CPU 52 executes programs stored in the memory 54 for each type of the processes to be implemented.

A normal-time processing circuit M10 generates an operation signal MS for the inverter 40 for controlling the assist torque of the synchronous motor 34. In this event, the normal-time processing circuit M10 receives an input of the rotational angle θp0 of the rotary shaft 34a which is detected by the rotational angle sensor 58, the currents iu, iv, and iw which are detected by the current sensor 64, the vehicle speed V which is detected by the vehicle speed sensor 62, and the steering torque Trqs which is detected by the torque sensor 60.

A sensorless processing circuit M20 controls the assist torque of the synchronous motor 34 without using the rotational angle θp0 detected by the rotational angle sensor 58 in the case where an abnormality is caused in the rotational angle sensor 58.

A selector M12 selectively outputs, to the inverter 40, one of the operation signal MS generated by the normal-time processing circuit M10 and the operation signal MS generated by the sensorless processing circuit M20 in accordance with the presence or absence of an abnormality of the rotational angle sensor 58. It should be noted that, in reality, the sensorless processing circuit M20 does not execute a process for calculating the operation signal MS before an abnormality is caused in the rotational angle sensor 58 and the normal-time processing circuit M10 does not execute a process for calculating the operation signal MS after an abnormality is caused in the rotational angle sensor 58. In a process for determining the presence or absence of an abnormality of the rotational angle sensor 58, for example, an abnormality may be determined in the case where a value output from the rotational angle sensor 58 is stationary continuously for a predetermined time or more even if the absolute value of the steering torque Trqs is a predetermined value or more.

The sensorless processing circuit M20 will be discussed in detail below. A command current setting processing circuit M24 sets a command current iγ* for γ axis of a γδ coordinate system which is a rotating coordinate system and a command current iδ* for δ axis. In the present embodiment, in particular, the command current iγ* for γ axis set to as a positive value, and the command current iδ* for δ axis is set to zero.

A γδ conversion processing circuit M26 converts the currents iu, iv, and iw in a three-phase fixed coordinate system into a current iγ for γ axis of the γδ coordinate system which is a rotating coordinate system and a current iδ for δ axis. The rotational angle utilized by the γδ conversion processing circuit M26 for the coordinate conversion is a control angle θc to be discussed later.

A deviation calculation processing circuit M28 subtracts the current iγ from the command current iγ* for γ axis, and outputs the resulting difference. A deviation calculation processing circuit M30 subtracts the current iδ from the command current iδ* for δ axis, and outputs the resulting difference. A current feedback processing circuit M32 takes in the output from the deviation calculation processing circuit M28, and outputs a command voltage vγ* on γ axis as a manipulated variable for controlling the current iγ for γ axis to the command current iγ* through feedback control. A current feedback processing circuit M34 takes in the output from the deviation calculation processing circuit M30, and outputs a command voltage vδ* on δ axis as a manipulated variable for controlling the current iδ for δ axis to the command current iδ* through feedback control. The current feedback processing circuits M32 and M34 may output, as the manipulated variable, the sum of a value output from a proportional element for the input and a value output from an integral element for the input.

An αβ conversion processing circuit M36 converts the command voltages vγ* and vδ* on γ and δ axes into command voltages vα* and vβ* on α and β axes, and outputs the command voltages vα* and vβ*. The predetermined rotational angle utilized by the αβ conversion processing circuit M36 for the coordinate conversion is the control angle θc to be discussed later.

A uvw conversion processing circuit M38 converts the command voltages vα* and vβ* on α and β axes into command voltages vu*, vv*, and vw* in the three-phase fixed coordinate system. An operation signal generation processing circuit M40 generates the operation signal MS for the inverter 40 such that line voltages output from the inverter 40 are phase voltages determined by the command voltages vu*, vv*, and vw*, and outputs the operation signal MS.

An αβ conversion processing circuit M44 converts the currents iu, iv, and iw into currents iα and iβ in αβ coordinate system. An induced voltage observer M46 estimates induced voltages eα and eβ on α and β axes on the basis of the currents iα and iβ which are output from the αβ conversion processing circuit M44, the command voltages vα* and vβ*, and an estimated variation amount ω1 to be discussed later. An angle calculation processing circuit M48 calculates an estimated angle θe1 as a value output from an arctangent function that takes eβ/eα, which is the ratio between the estimated induced voltages eα and eβ, as an input. A speed calculation processing circuit M50 takes the estimated angle θe1 as an input to calculate the estimated variation amount ω1. The estimated variation amount ω1 indicates the amount of variation in estimated angle θe1 per predetermined time ΔT. When a variation speed ωe1 of the estimated angle θe1 is used, the estimated variation amount ω1 is represented as ωe1·ΔT.

A dead band processing circuit M52 calculates steering torque Trqs1 which is zero in the case where the magnitude of the steering torque Trqs which is detected by the torque sensor 60 is equal to or less than a threshold TrqL and which is a value obtained by subjecting the steering torque Trqs to a decrease correction by the threshold TrqL in the case where the magnitude of the steering torque Trqs is not equal to or less than the threshold TrqL.

A target torque setting processing circuit M53 sets target torque Trqs*. In the present embodiment, the target torque Trqs* is assumed to be zero.

An update amount calculation processing circuit M54 calculates an update amount Δθc2 which serves as the base of an update amount Δθc for the control angle θc in the predetermined time ΔT, in order to manipulate the control angle θc to control the steering torque Trqs1 to the target torque Trqs* through feedback control, and outputs the update amount Δθc2. In the present embodiment, it is assumed that the current which flows through the synchronous motor 34 is controlled in a region between the positive side of d axis and the positive side of q axis in a rotating coordinate system. In other words, it is assumed that the phase of the current is controlled in a region of 0 to −90°. The positive direction of d axis is defined as the direction of the magnetic pole, and the positive direction of q axis is defined as the direction rotated by 90°, in electrical angle, with respect to d axis in the direction in which the synchronous motor 34 is rotating. In addition, the phase of the current is defined as an angle formed by the direction of the current vector (positive direction of γ axis) and q axis, and as being positive in the case where the phase changes in the rotational direction from q axis. In this case, the phase of the current has a constant value in the case where the update amount Δθc for the control angle θc is equal to the actual amount of rotation of the synchronous motor 34 per predetermined time ΔT. In the case where the update amount Δθc is larger than the actual amount of rotation of the synchronous motor 34 per predetermined time ΔT, in contrast, the phase of the current is varied so as to advance the current vector. In the case where the update amount Δθc is smaller than the actual amount of rotation of the synchronous motor 34 per predetermined time ΔT, meanwhile, the phase of the current is varied so as to delay the current vector. Therefore, in the present embodiment, the control angle θc is manipulated to control the phase of the current as a parameter for determining the phase of the current.

Specifically, a deviation calculation processing circuit M54a calculates a value obtained by subtracting the target torque Trqs* from the steering torque Trqs1, and outputs the resulting difference. A feedback processing circuit M54b calculates an update amount Δθc1 as a manipulated variable for controlling the steering torque Trqs1 to the target torque Trqs* through feedback control on the basis of the value output from the deviation calculation processing circuit M54a, and outputs the update amount Δθc1. Particularly, the update amount Δθc1 is determined as the sum of a value output from a proportional element that takes the value output from the deviation calculation processing circuit M54a as an input and a value output from an integral element that takes the value output from the deviation calculation processing circuit M54a as an input.

A variation amount-based guarding processing circuit M54c performs a guarding process on the update amount Δθc1 on the basis of the estimated variation amount ω1. That is, the synchronous motor 34 is rotated by the estimated variation amount ω1 while the predetermined time ΔT elapses. Therefore, in the case where the steering torque Trqs1 is larger than the target torque Trqs*, the update amount Δθc2 should be a value that has the same sign as that of the estimated variation amount ω1 and that is larger in magnitude (absolute value) than the estimated variation amount ω1, in order to increase torque of the synchronous motor 34. Therefore, the variation amount-based guarding processing circuit M54c outputs, as the update amount Δθc2, a value obtained by subjecting the update amount Δθc1 to a guarding process using a variation amount-based lower-limit guard value which is larger than the magnitude of the estimated variation amount ω1 by a predetermined value. In the case where the steering torque Trqs1 coincides with the target torque Trqs*, meanwhile, the update amount Δθc should coincide with the estimated variation amount ω1, in order to maintain such a state. Therefore, the variation amount-based guarding processing circuit M54c outputs, as the update amount Δθc2, a value obtained by subjecting the update amount Δθc1 to a guarding process using a variation amount-based upper-limit guard value, which is equal to the estimated variation amount ω1, and the variation amount-based lower-limit guard value.

A torque-based guarding processing circuit M60 outputs the update amount Δθc which is obtained by performing a guarding process to be discussed later on the update amount Δθc2. An update processing circuit M56 updates the control angle θc by adding the current update amount Δθc to the control angle θc in the preceding control cycle. The predetermined time ΔT coincides with the control cycle.

Next, the torque-based guarding processing circuit M60 will be described. In the sensorless processing circuit M20, the torque-based guarding processing circuit M60 executes a guarding process for allowing continuation of the assist control even in the case where a systematic error is caused in a process circuit that calculates the update amount Δθc for the control angle θc. That is, the torque-based guarding processing circuit M60 operates in the case where a systematic error is caused in the αβ conversion processing circuit M44, the induced voltage observer M46, the angle calculation processing circuit M48, the speed calculation processing circuit M50, the dead band processing circuit M52, the target torque setting processing circuit M53, or the update amount calculation processing circuit M54.

Figure 3:
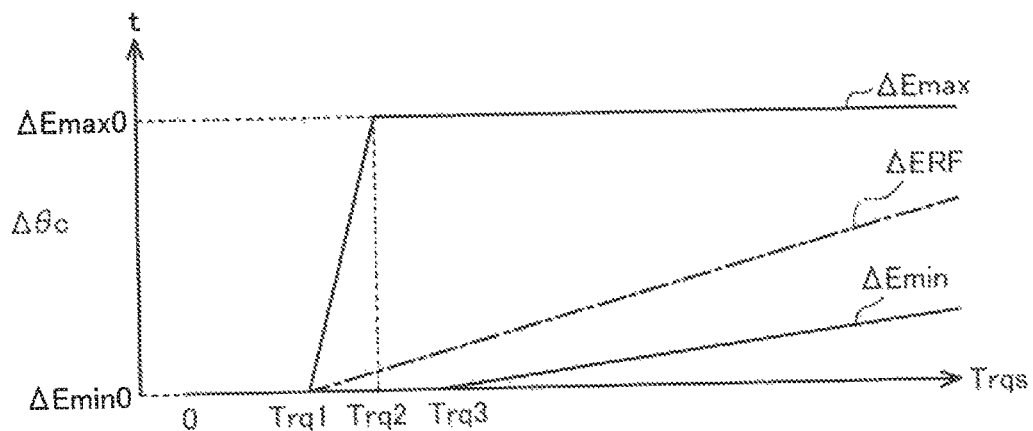
FIG. 3 illustrates a reference upper-limit guard value and a reference lower-limit guard value according to the first embodiment.

FIG. 3 indicates a reference upper-limit guard value ΔEmax and a reference lower-limit guard value ΔEmin used by the torque-based guarding processing circuit M60. In FIG. 3, the magnitude (absolute value) of the steering torque Trqs and the magnitude (absolute value) of the update amount Δθc for the control angle θc in the rotational direction of the rotary shaft 34a which matches the steering torque Trqs are indicated. In the following, the process performed by the torque-based guarding processing circuit M60 is all described as an upper-limit guarding process and a lower-limit guarding process for the magnitude of the update amount Δθc in the rotational direction of the rotary shaft 34a which matches the steering torque Trqs. Thus, the wording "the steering torque Trqs is large" means that the magnitude (absolute value) of the steering torque Trqs is large irrespective of whether the steering torque Trqs has a value on the right turn side or a value on the left turn side unless otherwise noted. Also, the wording "the update amount Δθc is large" means that the update amount for the control angle θc in the rotational direction of the rotary shaft 34a which matches the steering torque Trqs is large. The update amount Δθc2 which is output from the update amount calculation processing circuit M54 of FIG. 2 has a sign that matches the rotational direction of the rotary shaft 34a. Therefore, in the process performed by the torque-based guarding processing circuit M60 to be discussed later, in practice, a lower-limit guard value on the left turn side may be a value obtained by changing the sign of the upper-limit guard value on the right turn side, and an upper-limit guard value on the left turn side may be a value obtained by changing the sign of the lower-limit guard value on the right turn side, for a process exclusively for rotation on the right turn side and a process on the left turn side.

The reference upper-limit guard value ΔEmax is a value that is larger than zero when the steering torque Trqs is equal to or more than first torque Trq1, and is a value that is larger as the steering torque Trqs is larger when the steering torque Trqs is between the first torque Trq1 and second torque Trq2. In addition, the reference upper-limit guard value ΔEmax is constant at a maximum value ΔEmax0 when the steering torque Trqs is equal to or more than the second torque Trq2.

Meanwhile, the reference lower-limit guard value ΔEmin is a minimum value ΔEmin0 which is zero when the steering torque Trqs is less than third torque Trq3, and is a value that is larger as the steering torque Trqs is larger when the steering torque Trqs is equal to or more than the third torque Trq3.

Such setting of the reference upper-limit guard value ΔEmax and the reference lower-limit guard value ΔEmin prescribes the range of a value that the update amount Δθc2 may take for a case where the systematic error described above is not caused. That is, in the case where a systematic error is not caused, the update amount Δθc2 has a larger value as the steering torque Trqs has a larger value, in order to increase the assist torque of the synchronous motor 34 by advancing the phase of the current for the synchronous motor 34. In the case where the steering torque Trqs is equal to or less than the threshold TrqL, meanwhile, the steering torque Trqs1 is zero, and coincides with the target torque Trqs*. Therefore, the update amount Δθc is the estimated variation amount ω1. Therefore, the sign of the update amount Δθc2 is determined by the sign of the steering torque Trqs, and the range of the reference upper-limit guard value ΔEmax and the reference lower-limit guard value ΔEmin can be determined by the magnitude of the steering torque Trqs.

A reference update amount ΔERF indicated in FIG. 3 determines an update amount assumed as an appropriate value that matches the steering torque Trqs. The reference update amount ΔERF has a larger value as the steering torque Trqs is larger. This means that the assist torque is insufficient in the case where the steering torque Trqs is large, compared to a case where the steering torque Trqs is small, and thus it is necessary to further advance the control angle θc in order to increase the assist torque of the synchronous motor 34 by advancing the phase of the current for the synchronous motor 34.

Figure 4:
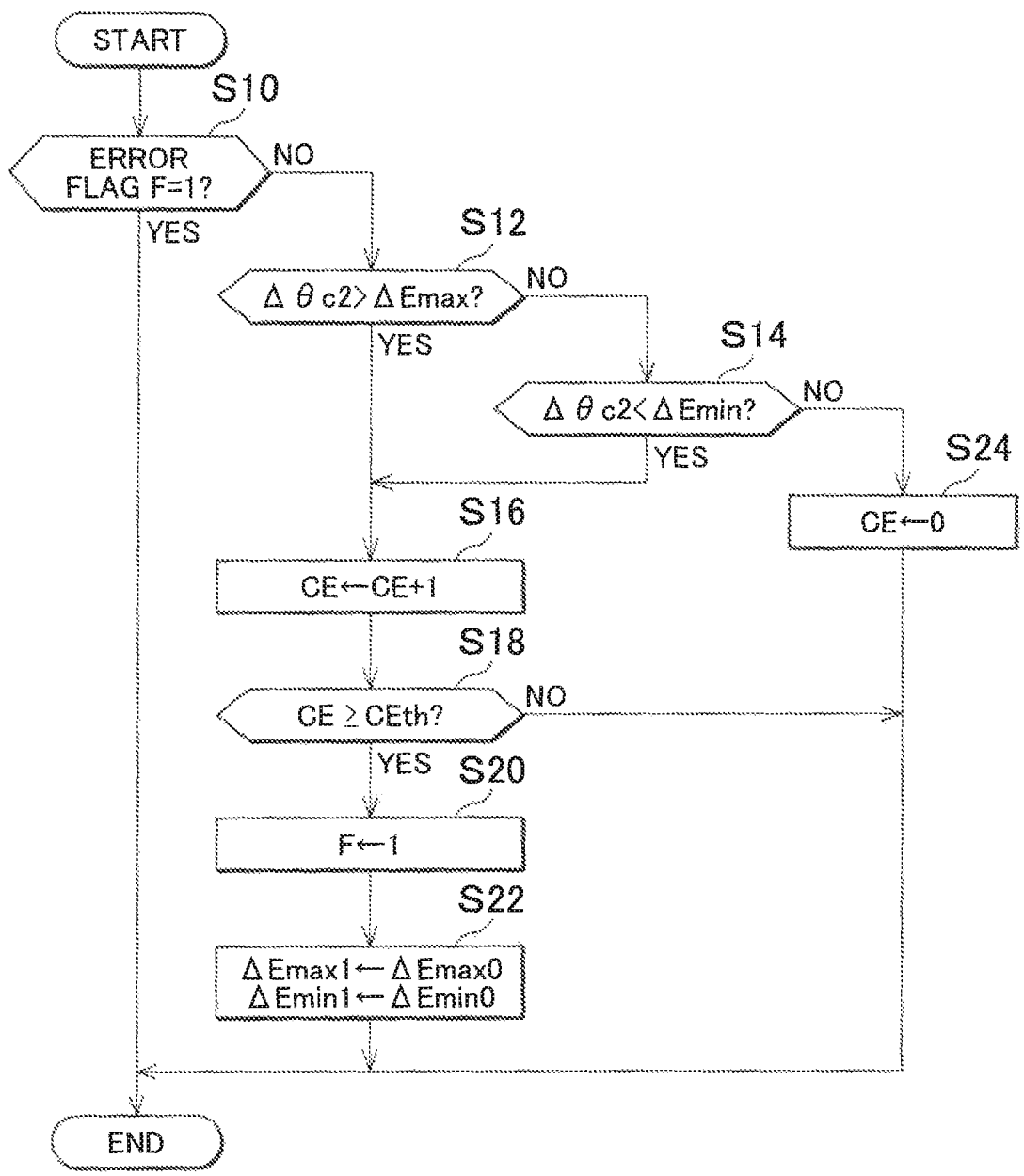
FIG. 4 is a flowchart illustrating the procedure of an abnormality determination process according to the first embodiment.

FIG. 4 illustrates the procedure of a process for determining the presence or absence of a systematic error executed by the torque-based guarding processing circuit M60. The process illustrated in FIG. 4 is repeatedly executed in predetermined cycles, for example. In the following, the subject is described as the CPU 52.

In a sequence of processes illustrated in FIG. 4, the CPU 52 first determines whether or not an error flag F is one (S10). In the case where the error flag F is one, it is indicated that a systematic error is caused. In the case where the error flag F is zero, it is indicated that a systematic error is not caused. In the case where it is determined that the error flag F is zero (S10: NO), the CPU 52 determines whether or not the update amount $\Delta\theta c2$ is larger than the reference upper-limit guard value $\Delta Emax$ (S12). In the case where it is determined that the update amount $\Delta\theta c2$ is not larger than the reference upper-limit guard value $\Delta Emax$ (S12: NO), the CPU 52 determines whether or not the update amount $\Delta\theta c2$ is smaller than the reference lower-limit guard value $\Delta Emin$ (S14). In the case where it is determined that the update amount $\Delta\theta c2$ is larger than the reference upper-limit guard value $\Delta Emax$ (S12: YES), or in the case where the update amount $\Delta\theta c2$ is smaller than the reference lower-limit guard value $\Delta Emin$ (S14: YES), the CPU 52 increments an abnormality counter CE (S16). Then, the CPU 52 determines whether or not the abnormality counter CE is equal to or more than an abnormality threshold CEth (S18). In the case where it is determined that the abnormality counter CE is equal to or more than the abnormality threshold CEth (S18: YES), the error flag F is set to one (S20).

Then, the CPU 52 substitutes the maximum value $\Delta Emax0$ into a fluctuation upper-limit guard value $\Delta Emax1$ to be discussed later, and substitutes the minimum value $\Delta Emin0$ into a fluctuation lower-limit guard value $\Delta Emin1$ (S22). In the case where it is determined that the update amount $\Delta\theta c2$ is not smaller than the reference lower-limit guard value $\Delta Emin$ (S14: NO), the CPU 52 considers that the update amount $\Delta\theta c2$ is in the normal range, and initializes the abnormality counter CE (S24).

The CPU 52 temporarily ends the sequence of processes illustrated in FIG. 4 in the case where the process in step S22 or S24 is completed, in the case where the error flag F is one (S10: YES), or in the case where the abnormality counter CE is not equal to or more than the abnormality threshold CEth (S18: NO).

Figure 5:
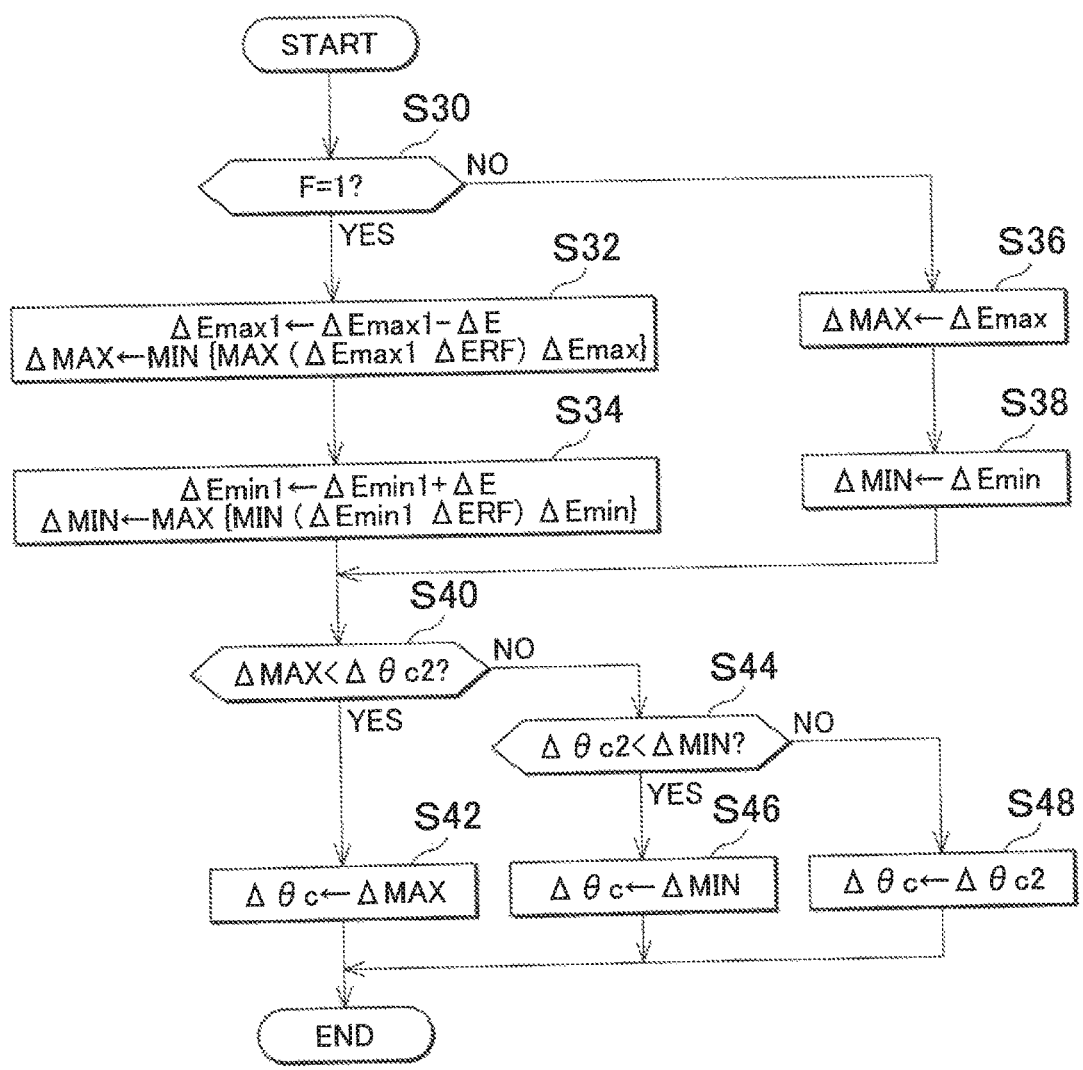
FIG. 5 is a flowchart illustrating the procedure of a process for changing a torque-based upper-limit guard value and a torque-based lower-limit guard value according to the first embodiment.

FIG. 5 illustrates the procedure of a torque-based guarding process. The process illustrated in FIG. 5 is repeatedly executed in predetermined cycles, for example. In the following, the subject is described as the CPU 52. In a sequence of processes illustrated in FIG. 5, the CPU 52 first determines whether or not the error flag F is one (S30). In the case where it is determined that the error flag F is one (S30: YES), the CPU 52 subjects the fluctuation upper-limit guard value $\Delta Emax1$ to a decrease correction by a predetermined amount $4E$, and sets a torque-based upper-limit guard value $\Delta MAX$ to be used in a guarding process for the update amount $\Delta\theta c2$ in accordance with the fluctuation upper-limit guard value $\Delta Emax1$ which has been subjected to the decrease correction (S32). Specifically, the CPU 52 determines the torque-based upper-limit guard value $\Delta MAX$ as the smaller one of: the maximum value of the fluctuation upper-limit guard value $\Delta Emax1$ and the reference update amount $\Delta ERF$; and the reference upper-limit guard value $\Delta Emax$. The reference update amount $\Delta ERF$ and the reference upper-limit guard value $\Delta Emax$ each have a value that matches the current steering torque Trqs.

This process is basically a process for determining the torque-based upper-limit guard value $\Delta MAX$ as the fluctuation upper-limit guard value $\Delta Emax1$ which has been subjected to a decrease correction on condition that the torque-based upper-limit guard value $\Delta MAX$ is equal to or more than the reference update amount $\Delta ERF$. It should be noted, however, that the reference upper-limit guard value $\Delta Emax$ depends on the steering torque Trqs as indicated in FIG. 3 although the fluctuation upper-limit guard value $\Delta Emax1$ itself does not depend on the steering torque Trqs. Therefore, the reference upper-limit guard value $\Delta Emax$ may be smaller than the maximum value of the fluctuation upper-limit guard value $\Delta Emax1$ and the reference update amount $\Delta ERF$. Therefore, the torque-based upper-limit guard value $\Delta MAX$ is determined as the smaller one of: the maximum value of the fluctuation upper-limit guard value $\Delta Emax1$ and the reference update amount $\Delta ERF$; and the reference upper-limit guard value $\Delta Emax$.

Next, the CPU 52 subjects the fluctuation lower-limit guard value $\Delta Emin1$ to an increase correction by the predetermined amount $\Delta E$, and sets a torque-based lower-limit guard value $\Delta MIN$ to be used in a guarding process for the update amount $\Delta\theta c2$ in accordance with the fluctuation lower-limit guard value $\Delta Emin1$ which has been subjected to the increase correction (S34). Specifically, the CPU 52 determines the torque-based lower-limit guard value $\Delta MIN$ as the larger one of: the minimum value of the fluctuation lower-limit guard value $\Delta Emin1$ and the reference update amount $\Delta ERF$; and the reference lower-limit guard value $\Delta Emin$. The reference update amount $\Delta ERF$ and the reference lower-limit guard value $\Delta Emin$ each have a value that matches the current steering torque Trqs.

This process is basically a process for determining the torque-based lower-limit guard value $\Delta MIN$ as the fluctuation lower-limit guard value $\Delta Emin1$ which has been subjected to an increase correction on condition that the torque-based lower-limit guard value $\Delta MIN$ is equal to or less than the reference update amount $\Delta ERF$. It should be noted, however, that the reference lower-limit guard value $\Delta Emin$ depends on the steering torque Trqs as indicated in FIG. 3 although the fluctuation lower-limit guard value $\Delta Emin1$ itself does not depend on the steering torque Trqs. Therefore, the reference lower-limit guard value $\Delta Emin$ may be larger than the minimum value of the fluctuation lower-limit guard value $\Delta Emin1$ and the reference update amount $\Delta ERF$. Therefore, the torque-based lower-limit guard value $\Delta MIN$ is determined as the larger one of: the minimum value of the fluctuation lower-limit guard value $\Delta Emin1$ and the reference update amount $\Delta ERF$; and the reference lower-limit guard value $\Delta Emin$.

In the case where it is determined that the error flag F is not one, that is, the error flag F is zero (S30: NO), meanwhile, the CPU 52 determines the torque-based upper-limit guard value $\Delta MAX$ as the reference upper-limit guard value $\Delta Emax$ (S36), and determines the torque-based lower-limit guard value $\Delta MIN$ as the reference lower-limit guard value $\Delta Emin$ (S38).

In the case where the process in step S34 or S38 is completed, the CPU 52 determines whether or not the update amount $\Delta\theta c2$ is larger than the torque-based upper-limit guard value $\Delta MAX$ (S40). In the case where it is determined that the update amount $\Delta\theta c2$ is larger than the torque-based upper-limit guard value $\Delta MAX$ (S40: YES), the CPU 52 determines the update amount $\Delta\theta c$ as the torque-based upper-limit guard value $\Delta MAX$ (S42).

In the case where it is determined that the update amount $\Delta\theta c2$ is not larger than the torque-based upper-limit guard value $\Delta MAX$ (S40: NO), on the other hand, the CPU 52 determines whether or not the update amount $\Delta\theta c2$ is smaller than the torque-based lower-limit guard value $\Delta MIN$ (S44). In the case where it is determined that the update amount $\Delta\theta c2$ is smaller than the torque-based lower-limit guard value $\Delta MIN$ (S44: YES), the CPU 52 determines the update amount $\Delta\theta c$ as the torque-based lower-limit guard value $\Delta MIN$ (S46).

In the case where it is determined that the update amount $\Delta\theta c2$ is not smaller than the torque-based lower-limit guard value ΔMIN (S44: NO), in contrast, the update amount Δθc2 is between the torque-based upper-limit guard value ΔMAX and the torque-based lower-limit guard value ΔMIN, and thus the CPU 52 determines the update amount Δθc2 itself as the update amount Δθc to be used to update the control angle θc (S48).

In the case where the process in step S42, S46, or S48 is completed, the CPU 52 temporarily ends the sequence of processes illustrated in FIG. 5.

Figure 6:
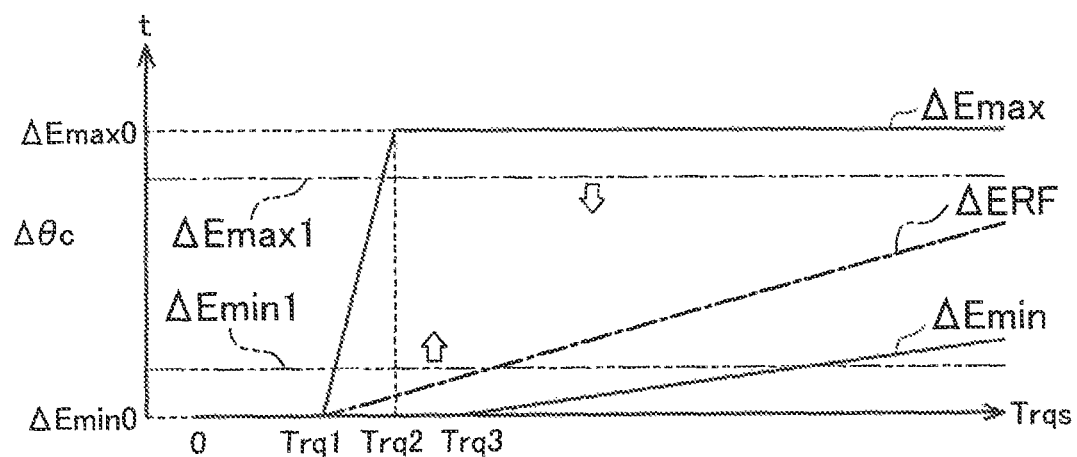
FIG. 6 is a time chart illustrating the procedure of the process for changing the torque-based upper-limit guard value and the torque-based lower-limit guard value according to the first embodiment.

The effect of the present embodiment will be described. In the case where the update amount Δθc2 which is output from the update amount calculation processing circuit M54 is out of the allowable range of the update amount Δθc2 which is determined by the reference upper-limit guard value ΔEmax and the reference lower-limit guard value ΔEmin, the CPU 52 detects a systematic error. Then, as illustrated in FIG. 6, the CPU 52 contracts the allowable range of the update amount Δθc which is determined by the torque-based upper-limit guard value ΔMAX and the torque-based lower-limit guard value ΔMIN by a decrease correction of the fluctuation upper-limit guard value ΔEmax1 and an increase correction of the fluctuation lower-limit guard value ΔEmin1. Consequently, the update amount Δθc is converged to the reference update amount ΔERF. Therefore, the assist control can be executed even in the case where an abnormality is caused in the update amount Δθc2 which is output from the update amount calculation processing circuit M54.

According to the present embodiment described above, the following effect can be further obtained.

(1) It tends to be difficult for the update amount Δθc1 for the control angle θc, which is determined by the feedback processing circuit M54b, to have an appropriate value in the case where the rotational speed of the synchronous motor 34 is high. In the present embodiment, in this respect, the update amount calculation processing circuit M54 includes the variation amount-based guarding processing circuit M54c, which allows the update amount Δθc2 to have an appropriate value even in the case where the rotational speed of the synchronous motor 34 is high.

Moreover, the torque-based guarding processing circuit M60 can suppress excessive deviation of the update amount Δθc from an appropriate value in the case where a systematic error such as an abnormality in the process performed by the variation amount-based guarding processing circuit M54c itself is caused. The guarding process performed by the torque-based guarding processing circuit M60 and the guarding process performed by the variation amount-based guarding processing circuit M54c employ different logics. Therefore, a reduction in reliability of the torque-based guarding processing circuit M60 can be suppressed even in the case where an abnormality is caused in the logic employed by the variation amount-based guarding processing circuit M54c, for example.

A second embodiment will be described below with reference to the drawings with focus on the differences from the first embodiment.

In the first embodiment described above, in order to perform appropriate assist control early when a systematic error is caused, it is necessary to increase the update amount Δθc toward the reference update amount ΔERF early, particularly in the case where the update amount Δθc2 is smaller than the reference update amount ΔERF. In the first embodiment described above, however, the decrease speed of the fluctuation upper-limit guard value ΔEmax1 and the increase speed of the fluctuation lower-limit guard value ΔEmin1 are the same as each other. Therefore, if the decrease speed of the fluctuation upper-limit guard value ΔEmax1 is decided in accordance with a request to increase the update amount Δθc toward the reference update amount ΔERF early in the case where the update amount Δθc2 is smaller than the reference update amount ΔERF, the user may feel a sense of discomfort in the case where an abnormality in which the update amount Δθc2 is larger than the reference upper-limit guard value ΔEmax is caused. That is, the update amount Δθc may be decreased abruptly, the assist torque may be decreased abruptly, and the user may feel that it has suddenly become difficult to turn the steering member 12.

Thus, in the present embodiment, the decrease speed of the fluctuation upper-limit guard value ΔEmax1 and the increase speed of the fluctuation lower-limit guard value ΔEmin1 are independently set to respective appropriate values.

Figure 7:
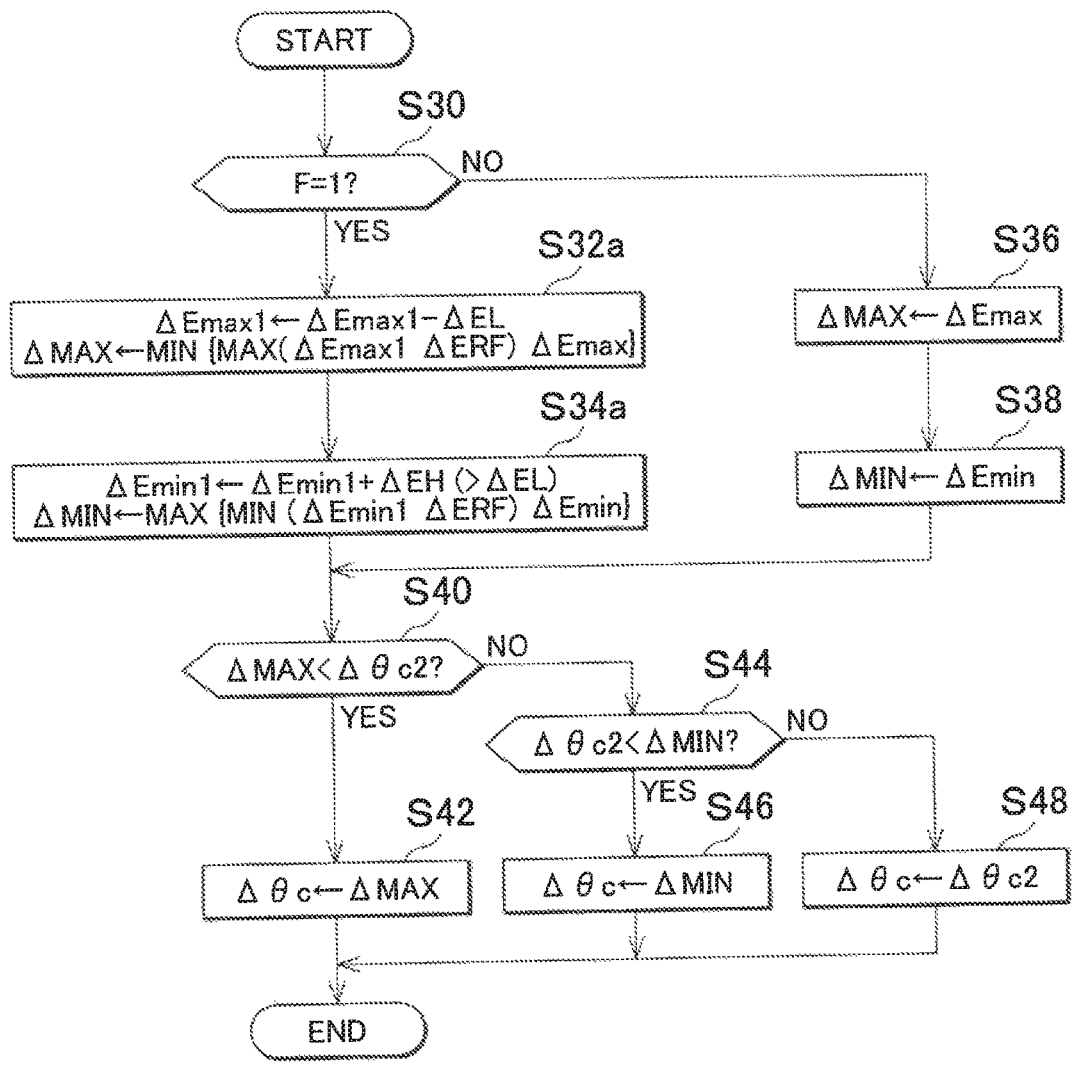
FIG. 7 is a flowchart illustrating the procedure of a process for changing a torque-based upper-limit guard value and a torque-based lower-limit guard value according to a second embodiment.

FIG. 7 illustrates the procedure of a torque-based guarding process according to the present embodiment. The process illustrated in FIG. 7 is repeatedly executed in predetermined cycles, for example. Processes in FIG. 7 corresponding to the processes illustrated in FIG. 5 are given identical step numbers to omit description for convenience.

In a sequence of processes illustrated in FIG. 7, in the case where it is determined that the error flag F is one (S30: YES), the CPU 52 subjects the fluctuation upper-limit guard value ΔEmax1 to a decrease correction by a low-speed change amount ΔEL, and sets the torque-based upper-limit guard value ΔMAX on the basis of the fluctuation upper-limit guard value ΔEmax1 which has been subjected to the decrease correction (S32a). Next, the CPU 52 subjects the fluctuation lower-limit guard value ΔEmin1 to an increase correction by a high-speed change amount ΔEH, which is larger than the low-speed change amount ΔEL, and sets the torque-based lower-limit guard value ΔMIN on the basis of the fluctuation lower-limit guard value ΔEmin1 which has been subjected to the increase correction (S34a).

A third embodiment will be described below with reference to the drawings with focus on the differences from the first embodiment.

In the first embodiment described above, the update amount Δθc is converged to the reference update amount ΔERF when an abnormality is caused in the update amount Δθc2 because of a systematic error, and thereafter the update amount Δθc is kept at the reference update amount ΔERF even in the case where the update amount Δθc2 is returned to a normal value. However, the reference update amount ΔERF is merely intended to continue the assist control when an abnormality is caused in the update amount calculation processing circuit M54 or the like, and it is desirable to adopt the update amount Δθc2 which has been returned to normal in order to achieve more appropriate assist control. Thus, in the present embodiment, a process for returning to a process for updating the control angle θc on the basis of the update amount Δθc2 is executed.

Figure 8:
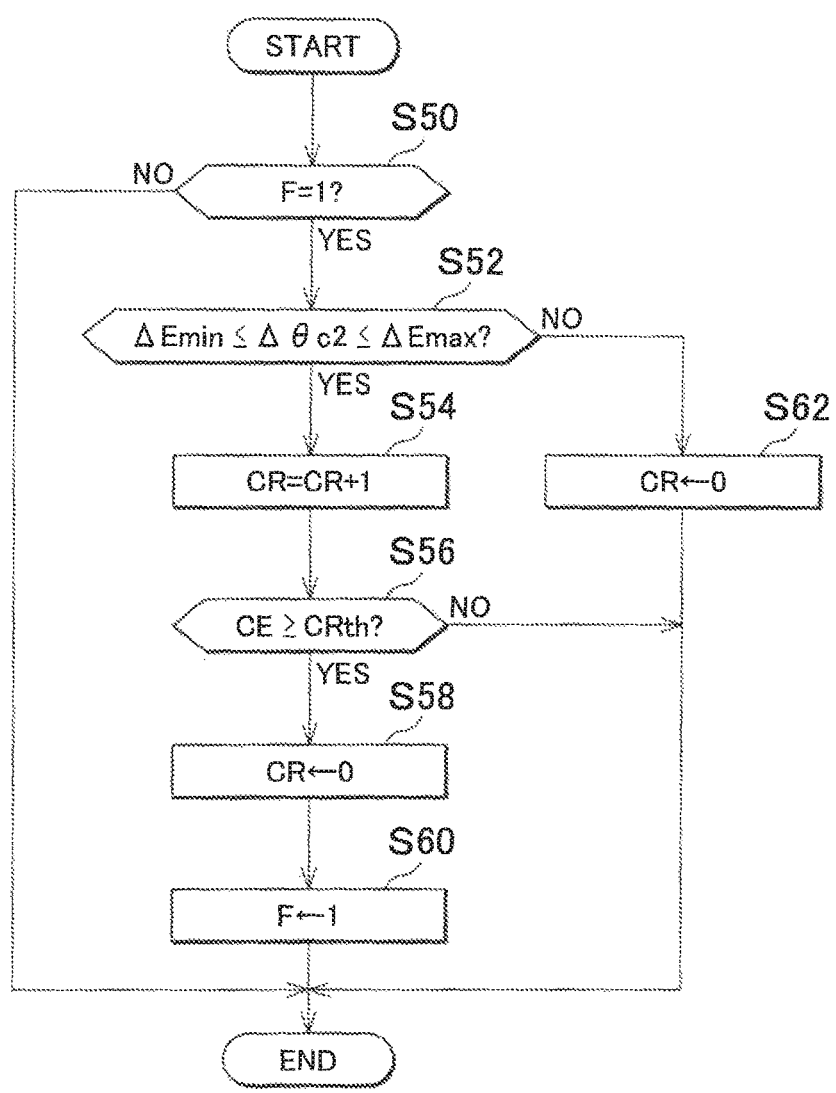
FIG. 8 is a flowchart illustrating the procedure of a process for determining recovery from an abnormality according to a third embodiment.

FIG. 8 illustrates the procedure of a process for determining recovery from an abnormality. The process illustrated in FIG. 8 is implemented as a process performed by the torque-based guarding processing circuit M60 when the CPU 52 executes a program stored in the memory 54. The process illustrated in FIG. 8 is repeatedly executed in predetermined cycles, for example.

In a sequence of processes illustrated in FIG. 8, the CPU 52 first determines whether or not the error flag F is one (S50). In the case where it is determined that the error flag F is one (S50: YES), the CPU 52 determines whether or not the update amount Δθc2 which is calculated by the update amount calculation processing circuit M54 and input to the torque-based guarding processing circuit M60 is equal to or more than the reference lower-limit guard value $\Delta$Emin and equal to or less than the reference upper-limit guard value $\Delta$Emax (S52). In the case where it is determined that the update amount $\Delta\theta c2$ is equal to or more than the reference lower-limit guard value $\Delta$Emin and equal to or less than the reference upper-limit guard value $\Delta$Emax (S52: YES), the CPU 52 increments a recovery counter CR (S54). Then, the CPU 52 determines whether or not the recovery counter CR is equal to or more than a recovery threshold CRth (S56). In the case where it is determined that the recovery counter CR is equal to or more than the recovery threshold CRth (S56: YES), the CPU 52 initializes the recovery counter CR (S58), and sets the error flag F to zero (S60).

In the case where it is determined that the update amount $\Delta\theta c2$ is less than the reference lower-limit guard value $\Delta$Emin or more than the reference upper-limit guard value $\Delta$Emax (S52: NO), the CPU 52 initializes the recovery counter CR (S62).

Figure 9:
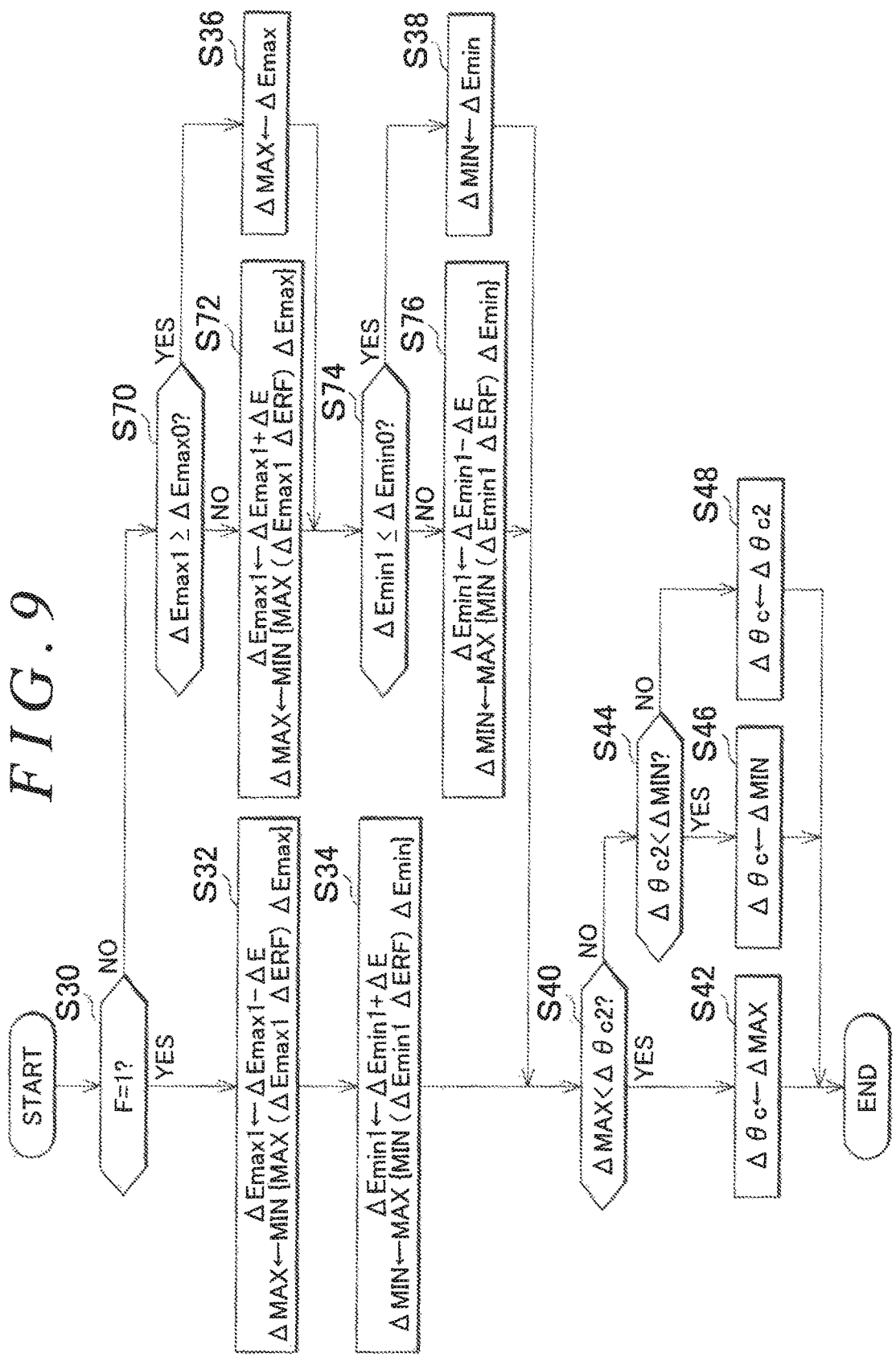
FIG. 9 is a flowchart illustrating the procedure of a process for changing a torque-based upper-limit guard value and a torque-based lower-limit guard value according to the third embodiment.

In the case where the process in step S60 or S62 is completed, or in the case where a negative determination is made in step S50, the CPU 52 temporarily ends the sequence of processes illustrated in FIG. 8. FIG. 9 illustrates the procedure of a torque-based guarding process according to the present embodiment. The process illustrated in FIG. 9 is repeatedly executed in predetermined cycles, for example. Processes in FIG. 9 corresponding to the processes illustrated in FIG. 5 are given identical step numbers to omit description for convenience.

In a sequence of processes illustrated in FIG. 9, in the case where it is determined that the error flag F is zero (S30: NO), the CPU 52 determines whether or not the fluctuation upper-limit guard value $\Delta$Emax1 is equal to or more than the maximum value $\Delta$Emax0 (S70). In the case where it is determined that the fluctuation upper-limit guard value $\Delta$Emax1 is not equal to or more than the maximum value $\Delta$Emax0 (S70: NO), the CPU 52 subjects the fluctuation upper-limit guard value $\Delta$Emax1 to an increase correction by the predetermined amount $\Delta$E, and sets the torque-based upper-limit guard value $\Delta$MAX in accordance with the fluctuation upper-limit guard value $\Delta$Emax1 which has been subjected to the increase correction (S72). Specifically, the CPU 52 determines the torque-based upper-limit guard value $\Delta$MAX as the smaller one of: the maximum value of the fluctuation upper-limit guard value $\Delta$Emax1 and the reference update amount $\Delta$ERF; and the reference upper-limit guard value $\Delta$Emax. The reference update amount $\Delta$ERF and the reference upper-limit guard value $\Delta$Emax each have a value that matches the current steering torque Trqs.

In the case where the CPU 52 determines that the fluctuation upper-limit guard value $\Delta$Emax1 is equal to or more than the maximum value $\Delta$Emax0 (S70: YES), on the other hand, the process proceeds to step S36. In the case where the process in step S72 or S36 is completed, the CPU 52 determines whether or not the fluctuation lower-limit guard value $\Delta$Emin1 is equal to or less than the minimum value $\Delta$Emin0 (S74). In the case where it is determined that the fluctuation lower-limit guard value $\Delta$Emin1 is not equal to or less than the minimum value $\Delta$Emin0 (S74: NO), the CPU 52 subjects the fluctuation lower-limit guard value $\Delta$Emin1 to a decrease correction by the predetermined amount $\Delta$E, and sets the torque-based lower-limit guard value $\Delta$MIN in accordance with the fluctuation lower-limit guard value $\Delta$Emin1 which has been subjected to the decrease correction (S76). Specifically, the CPU 52 determines the torque-based lower-limit guard value $\Delta$MIN as the larger one of: the minimum value of the fluctuation lower-limit guard value $\Delta$Emin1 and the reference update amount $\Delta$ERF; and the reference upper-limit guard value $\Delta$Emax. The reference update amount $\Delta$ERF and the reference lower-limit guard value $\Delta$Emin each have a value that matches the current steering torque Trqs. In the case where the process in step S76 is completed, the process proceeds to step S40.

In the case where the CPU 52 determines that the fluctuation lower-limit guard value $\Delta$Emin1 is equal to or less than the minimum value $\Delta$Emin0 (S74: YES), on the other hand, the process proceeds to step S38. In this way, in the present embodiment, in the case where it is determined that recovery from an abnormal state has been made, the allowable range of the update amount $\Delta\theta c$ which is determined by the torque-based upper-limit guard value $\Delta$MAX and the torque-based lower-limit guard value $\Delta$MIN is gradually expanded. Therefore, it is possible to suppress abrupt variations in the update amount $\Delta\theta c$, and hence to suppress abrupt variations in torque of the synchronous motor 34, compared to a case where the torque-based upper-limit guard value $\Delta$MAX and the torque-based lower-limit guard value $\Delta$MIN are returned stepwise to the reference upper-limit guard value $\Delta$Emax and the reference lower-limit guard value $\Delta$Emin.

A fourth embodiment will be described below with reference to the drawings with focus on the differences from the third embodiment.

In the third embodiment described above, in the case where the update amount $\Delta\theta c2$ is extremely close to the reference lower-limit guard value $\Delta$Emin when recovery from a systematic error is made, the user may feel that the assist torque has been decreased abruptly in the case where the torque-based lower-limit guard value $\Delta$MIN is returned to the reference lower-limit guard value $\Delta$Emin early. In the case where the update amount $\Delta\theta c2$ is larger than the reference update amount $\Delta$ERF, meanwhile, it is desirable to return the torque-based upper-limit guard value $\Delta$MAX to the reference upper-limit guard value $\Delta$Emax early in order to respond to a request from the user early. In the third embodiment, however, the increase speed of the fluctuation upper-limit guard value $\Delta$Emax1 and the decrease speed of the fluctuation lower-limit guard value $\Delta$Emin1 are the same, and therefore the torque-based upper-limit guard value $\Delta$MAX and the torque-based lower-limit guard value $\Delta$MIN cannot be changed at respective optimum speeds.

Thus, in the present embodiment, the increase speed of the fluctuation upper-limit guard value $\Delta$Emax1 and the decrease speed of the fluctuation lower-limit guard value $\Delta$Emin1 are independently set to respective appropriate values.

Figure 10:
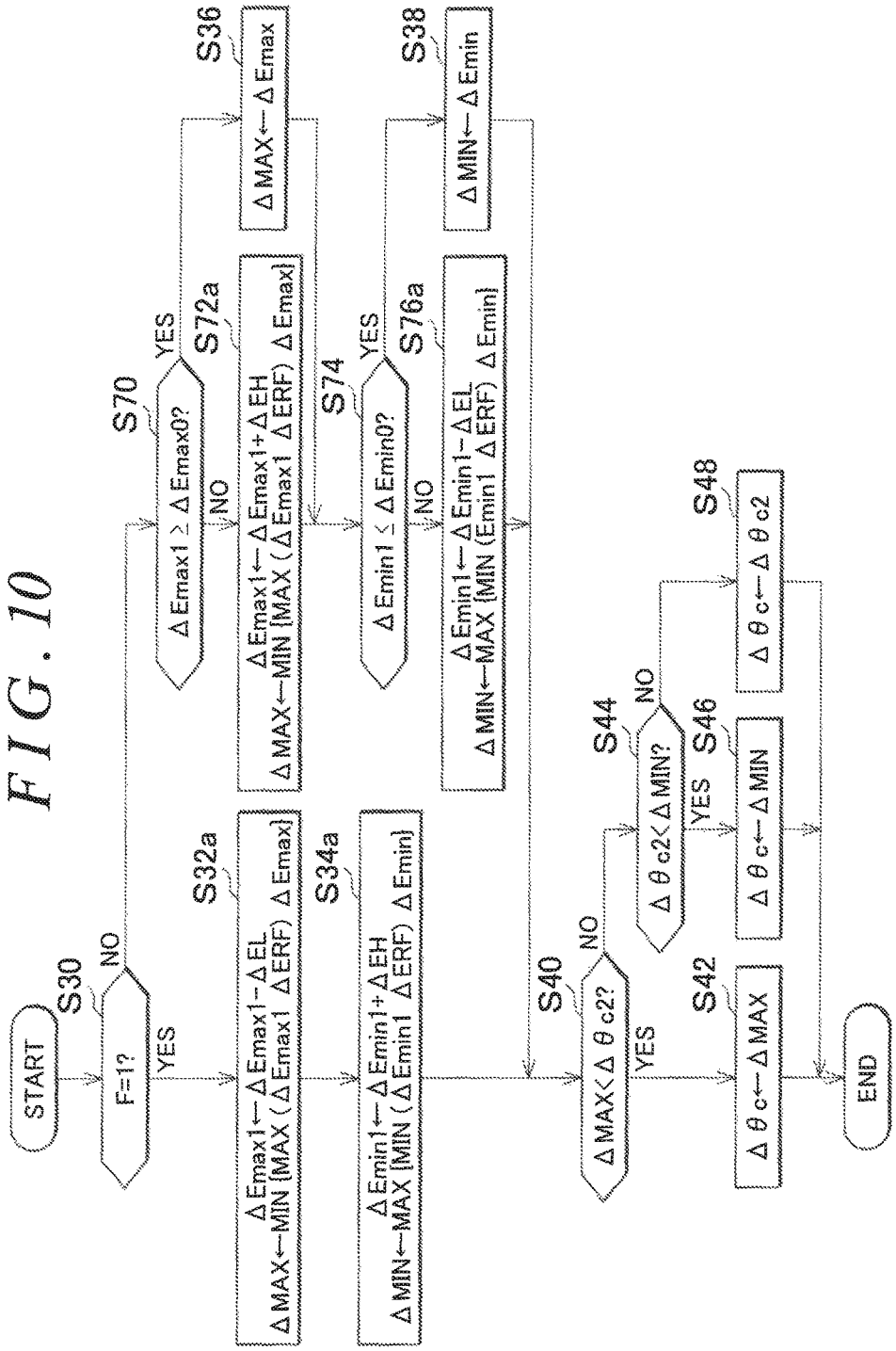
FIG. 10 is a flowchart illustrating the procedure of a process for changing a torque-based upper-limit guard value and a torque-based lower-limit guard value according to a fourth embodiment.

FIG. 10 illustrates the procedure of a torque-based guarding process according to the present embodiment. The process illustrated in FIG. 10 is repeatedly executed in predetermined cycles, for example. Processes in FIG. 10 corresponding to the processes illustrated in FIGS. 7 and 9 are given identical step numbers to omit description for convenience.

In a sequence of processes illustrated in FIG. 10, in the case where it is determined that the fluctuation upper-limit guard value $\Delta$Emax1 is smaller than the maximum value $\Delta$Emax0 (S70: NO), the CPU 52 subjects the fluctuation upper-limit guard value $\Delta$Emax1 to an increase correction by the high-speed change amount $\Delta$EH, and sets the torque-based upper-limit guard value $\Delta$MAX on the basis of the fluctuation upper-limit guard value $\Delta$Emax1 which has been subjected to the increase correction (S72a). In the case where it is determined that the fluctuation lower-limit guard value ΔEmin1 is not equal to or less than the reference lower-limit guard value ΔEmin (S74: NO), the CPU 52 subjects the fluctuation lower-limit guard value ΔEmin1 to a decrease correction by the low-speed change amount ΔEL, and sets the torque-based lower-limit guard value ΔMIN on the basis of the fluctuation lower-limit guard value ΔEmin1 which has been subjected to the decrease correction (S76a). In the case where the process in step S76a is completed in the CPU 52, the process proceeds to the process in step S40.

A fifth embodiment will be described below with reference to the drawings with focus on the differences from the fourth embodiment.

In the fourth embodiment described above, a single abnormality threshold CEth is used to prescribe the duration of an abnormal state to set the error flag F to one in both an abnormality in which the update amount Δθc2 is more than the reference upper-limit guard value ΔEmax and an abnormality in which the update amount Δθc2 is less than the reference lower-limit guard value ΔEmin. In other words, the duration of an abnormal state for making a determination that there is an abnormality is the same. If the abnormality threshold CEth is increased, the SN ratio can be increased, but it takes a longer time to bring the assist torque to an appropriate value. In the case where an abnormality in which the update amount Δθc2 falls below the reference lower-limit guard value ΔEmin, for example, is caused or the like, meanwhile, the assist torque of the synchronous motor 34 may be insufficient, and it is desirable that the update amount Δθc should be brought to the reference update amount ΔERF early.

Thus, in the present embodiment, the duration of an abnormal state before making a determination that there is an abnormality is set separately for an abnormality in which the update amount Δθc2 is more than the reference upper-limit guard value ΔEmax and an abnormality in which the update amount Δθc2 is less than the reference lower-limit guard value ΔEmin. In the present embodiment, in addition, only the torque-based upper-limit guard value ΔMAX is changed in the case where an abnormality in which the update amount Δθc2 is more than the reference upper-limit guard value ΔEmax is caused, and only the torque-based lower-limit guard value ΔMIN is changed in the case where an abnormality in which the update amount Δθc2 is less than the reference lower-limit guard value ΔEmin is caused.

Figure 11:
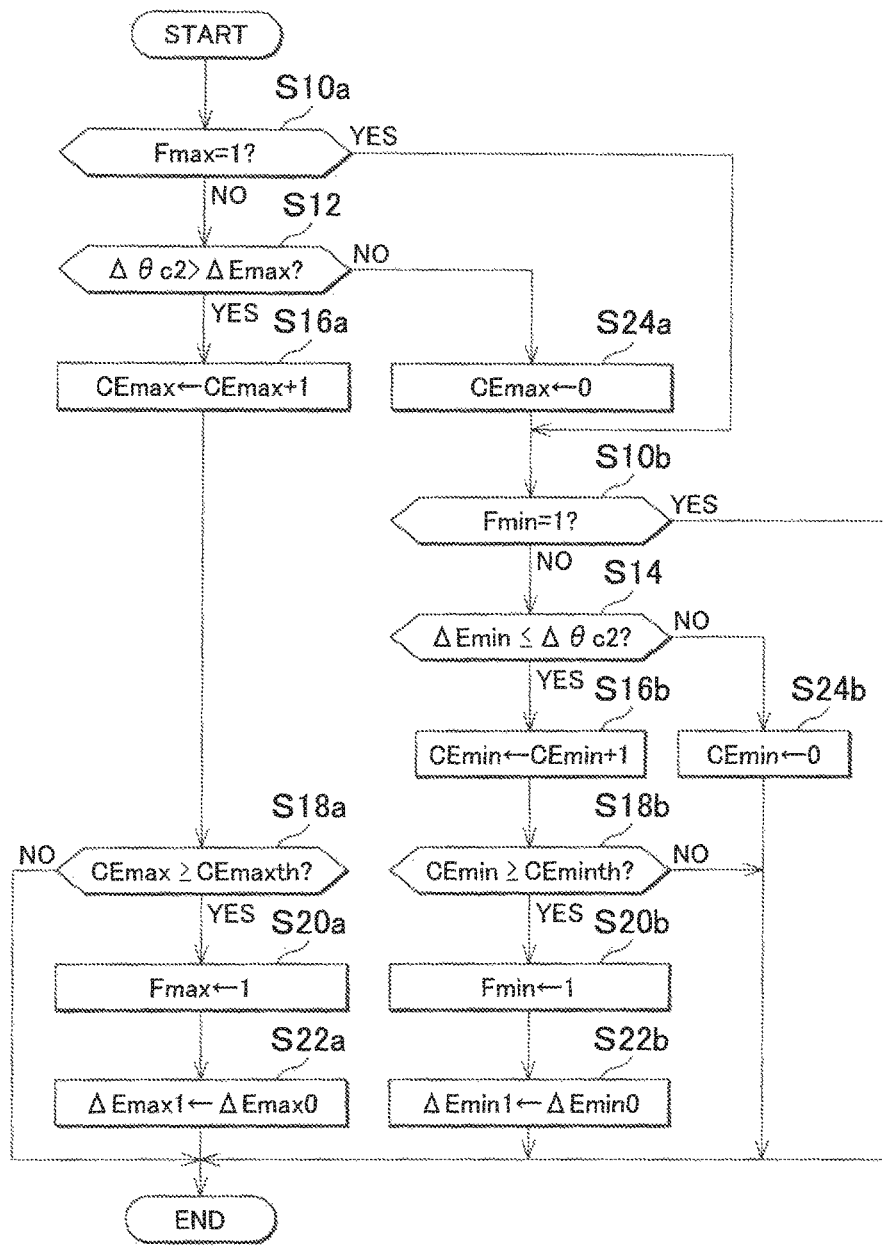
FIG. 11 is a flowchart illustrating the procedure of an abnormality determination process according to a fifth embodiment.

FIG. 11 illustrates the procedure of a process for determining the presence or absence of a systematic error executed by the torque-based guarding processing circuit M60 according to the present embodiment. The process illustrated in FIG. 11 is repeatedly executed in predetermined cycles, for example.

In a sequence of processes illustrated in FIG. 11, the CPU 52 first determines whether or not an upper-limit error flag Fmax is one (S10a). In the case where the upper-limit error flag Fmax is one, it is indicated that a systematic error in which the update amount Δθc2 is more than the reference upper-limit guard value ΔEmax is caused. In the case where the upper-limit error flag Fmax is zero, it is indicated that such a systematic error is not caused.

In the case where it is determined that the upper-limit error flag Fmax is zero (S10a: NO), the CPU 52 determines whether or not the update amount Δθc2 is larger than the reference upper-limit guard value ΔEmax (S12). In the case where it is determined that the update amount Δθc2 is larger than the reference upper-limit guard value ΔEmax (S12: YES), the CPU 52 executes the processes in steps S16 to S20 with the abnormality counter CE, the abnormality threshold CEth, and the error flag F replaced with an upper-limit abnormality counter CEmax, an upper-limit abnormality threshold CEmaxth, and the upper-limit error flag Fmax, respectively (S16a to S20a). Then, the CPU 52 substitutes the maximum value ΔEmax0 into the fluctuation upper-limit guard value ΔEmax1 (S22a).

In the case where it is determined that the update amount Δθc2 is not larger than the reference upper-limit guard value ΔEmax (S12: NO), on the other hand, the CPU 52 initializes the upper-limit abnormality counter CEmax (S24a). Then, the CPU 52 determines whether or not a lower-limit error flag Fmin is one (S10b). In the case where the lower-limit error flag Fmin is one, it is indicated that a systematic error in which the update amount Δθc2 is less than the reference lower-limit guard value ΔEmin is caused. In the case where the lower-limit error flag Fmin is zero, it is indicated that such a systematic error is not caused. In the case where it is determined that the lower-limit error flag Fmin is zero (S10b: NO), the CPU 52 determines whether or not the update amount Δθc2 is smaller than the reference lower-limit guard value ΔEmin (S14). In the case where it is determined that the update amount Δθc2 is smaller than the reference lower-limit guard value ΔEmin (S14: YES), the CPU 52 executes the processes in steps S16 to S20 with the abnormality counter CE, the abnormality threshold CEth, and the error flag F replaced with a lower-limit abnormality counter CEmin, a lower-limit abnormality threshold CEminth, and the lower-limit error flag Fmin, respectively (S16b to S20b). Then, the CPU 52 substitutes the minimum value ΔEmin0 into the fluctuation lower-limit guard value ΔEmin1 (S22b).

In the case where it is determined that the update amount Δθc2 is not smaller than the reference lower-limit guard value ΔEmin (S14: NO), on the other hand, the CPU 52 initializes the lower-limit abnormality counter CEmin (S24b). In the case where the process in step S22a, S22b, or S24b is completed, or in the case where a negative determination is made in step S18a, S18b, or in the case where a positive determination is made in step S10b, the CPU 52 temporarily ends the sequence of processes illustrated in FIG. 11.

The lower-limit abnormality threshold CEminth is set to be smaller than the upper-limit abnormality threshold CEmaxth. This aims to increase the assist torque early by bringing the update amount Δθc close to the reference update amount ΔERF early.

Figure 12:
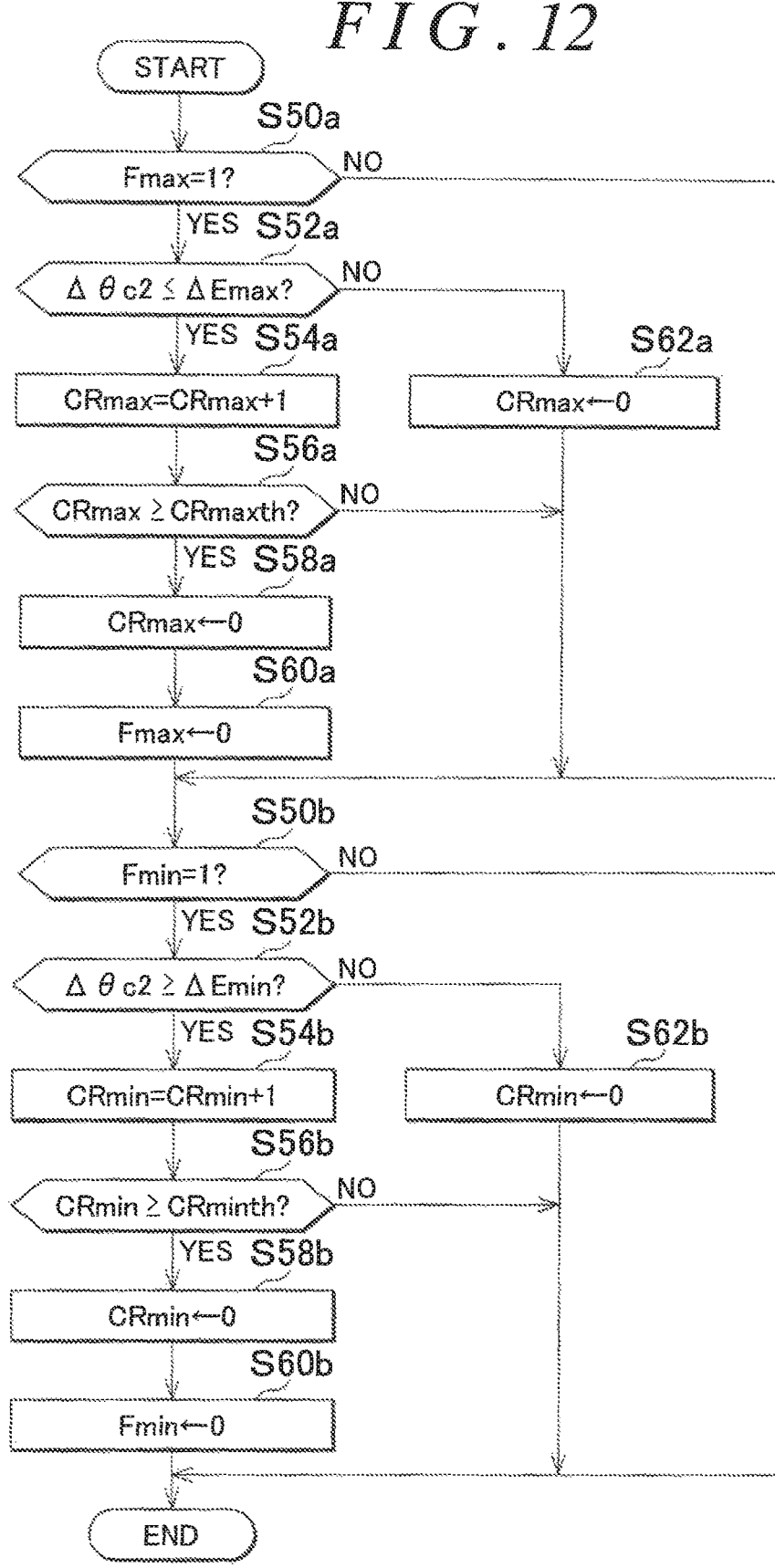
FIG. 12 is a flowchart illustrating the procedure of a process for determining recovery from an abnormality according to the fifth embodiment.

FIG. 12 illustrates the procedure of a process for determining recovery from an abnormality according to the present embodiment. The process illustrated in FIG. 12 is implemented as a process performed by the torque-based guarding processing circuit M60 when the CPU 52 executes a program stored in the memory 54. The process illustrated in FIG. 12 is repeatedly executed in predetermined cycles, for example.

In a sequence of processes illustrated in FIG. 12, the CPU 52 first determines whether or not the upper-limit error flag Fmax is one (S50a). In the case where it is determined that the upper-limit error flag Fmax is one (S50a: YES), the CPU 52 determines whether or not the update amount Δθc2 which is calculated by the update amount calculation processing circuit M54 and input to the torque-based guarding processing circuit M60 is equal to or less than the reference upper-limit guard value ΔEmax (S52a). In the case where it is determined that the update amount Δθc2 is equal to or less than the reference upper-limit guard value ΔEmax (S52a: YES), the CPU 52 executes the processes in steps S54 to S60 with the recovery counter CR, the recovery threshold CRth, and the error flag F replaced with an upper-limit recovery counter CRmax, an upper-limit recovery threshold CRmaxth, and the upper-limit error flag Fmax, respectively (S54a to S60a). In the case where it is determined that the update amount $\Delta\theta c2$ is not equal to or less than the reference upper-limit guard value $\Delta$Emax (S52a: NO), in contrast, the CPU 52 initializes the upper-limit recovery counter CRmax (S62a).

In the case where a negative determination is made in step S50a or S56a, or in the case where the process in step S60a or S62a is completed, meanwhile, the CPU 52 determines whether or not the lower-limit error flag Fmin is one (S50b). In the case where it is determined that the lower-limit error flag Fmin is one (S50b: YES), the CPU 52 determines whether or not the update amount $\Delta\theta c2$ which is calculated by the update amount calculation processing circuit M54 and input to the torque-based guarding processing circuit M60 is equal to or more than the reference lower-limit guard value $\Delta$Emin (S52b). In the case where it is determined that the update amount $\Delta\theta c2$ is equal to or more than the reference lower-limit guard value $\Delta$Emin (S52b: YES), the CPU 52 executes the processes in steps S54 to S60 with the recovery counter CR, the recovery threshold CRth, and the error flag F replaced with a lower-limit recovery counter CRmin, a lower-limit recovery threshold CRminth, and the lower-limit error flag Fmin, respectively (S54b to S60b). In the case where it is determined that the update amount $\Delta\theta c2$ is not equal to or more than the reference lower-limit guard value $\Delta$Emin (S52b: NO), in contrast, the CPU 52 initializes the lower-limit recovery counter CRmin (S62b).

In the case where the process in step S60b or S62b is completed, or in the case where a negative determination is made in step S50b or S56b, the CPU 52 temporarily ends the sequence of processes illustrated in FIG. 12.

The upper-limit recovery threshold CRmaxth is set to be smaller than the lower-limit recovery threshold CRminth. This aims to make it possible to generate larger assist torque in response to a request from the user by ending the process in which the update amount $\Delta\theta c$ is restricted to the reference update amount $\Delta$ERF early.

Figure 13:
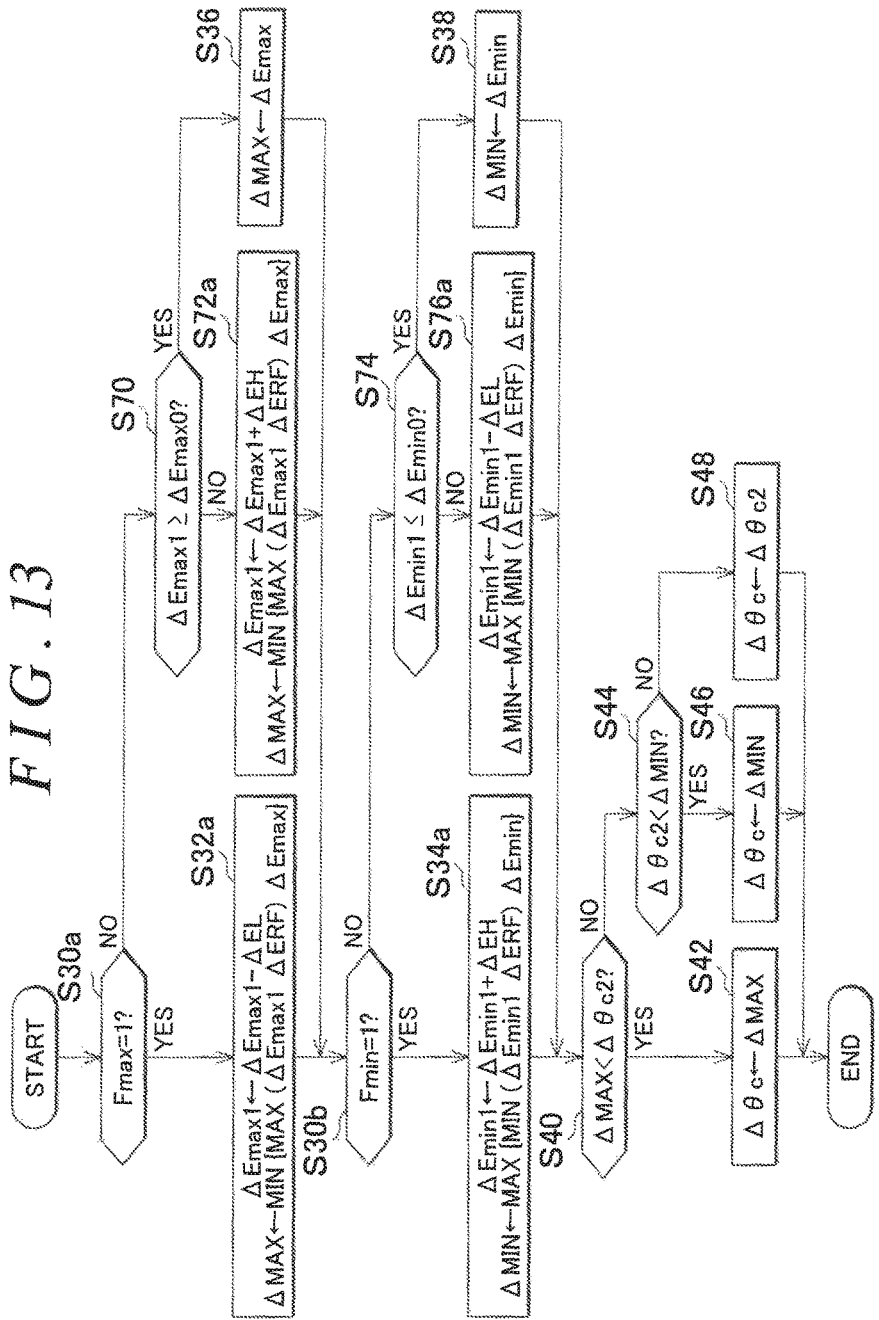
FIG. 13 is a flowchart illustrating the procedure of a process for changing a torque-based upper-limit guard value and a torque-based lower-limit guard value according to the fifth embodiment.

FIG. 13 illustrates the procedure of a torque-based guarding process according to the present embodiment. The process illustrated in FIG. 13 is repeatedly executed in predetermined cycles, for example. Processes in FIG. 13 corresponding to the processes illustrated in FIG. 10 are given identical step numbers to omit description for convenience.

In a sequence of processes illustrated in FIG. 13, the CPU 52 first determines whether or not the upper-limit error flag Fmax is one (S30a). In the case where the CPU 52 determines that the upper-limit error flag Fmax is one (S30a: YES), the process proceeds to step S32a. In the case where the CPU 52 determines that the upper-limit error flag Fmax is zero (S30a: NO), on the other hand, the process proceeds to step S70.

In the case where the process in step S32a, S72a, or S36 is completed, meanwhile, the CPU 52 determines whether or not the lower-limit error flag Fmin is one (S30b). In the case where the CPU 52 determines that the lower-limit error flag Fmin is one (S30b: YES), the process proceeds to step S34a. In the case where the CPU 52 determines that the lower-limit error flag Fmin is zero (S30b: NO), on the other hand, the process proceeds to step S74. In the case where the process in step S34a, S76a, or S38 is completed, the CPU 52 proceeds to the process in step S40.

The correspondence between the elements described in the claims and the elements in the embodiments is as follows. In the following, the CPU 52 which executes a predetermined process in accordance with a program stored in the memory 54 is described as the CPU 52 which executes a predetermined process in order to simplify description.

The power conversion circuit corresponds to the inverter 40. The current control processing circuit corresponds to the command current setting processing circuit M24, the $\gamma\delta$ conversion processing circuit M26, the deviation calculation processing circuit M28, the deviation calculation processing circuit M30, the current feedback processing circuit M32, the current feedback processing circuit M34, the $\alpha\beta$ conversion processing circuit M36, the uvw conversion processing circuit M38, and the operation signal generation processing circuit M40. The control angle manipulation processing circuit corresponds to the dead band processing circuit M52, the deviation calculation processing circuit M54a, and the feedback processing circuit M54b. The contraction processing circuit corresponds to the CPU 52 which executes the processes in steps S32 and S34 of FIGS. 5 and 9 or the CPU 52 which executes the processes in steps S32a and S34a of FIGS. 7, 10, and 13.

The process in which the torque-based upper-limit guard value is decreased on condition that the torque-based upper-limit guard value is equal to or more than the reference update amount corresponds to the CPU 52 which executes the process in step S32 or the CPU 52 which executes the process in step S32a. The process in which the torque-based lower-limit guard value is increased on condition that the torque-based lower-limit guard value is equal to or less than the reference update amount corresponds to the CPU 52 which executes the process in step S34 or the CPU 52 which executes the process in step S34a.

The contraction processing circuit corresponds to the CPU 52 which executes the processes in steps S32a and S34a of FIGS. 7, 10, and 13. The upper-limit abnormality determination time corresponds to a time determined by the upper-limit abnormality threshold CEmaxth. The lower-limit abnormality determination time corresponds to a time determined by the lower-limit abnormality threshold CEminth.

The expansion processing circuit corresponds to the CPU 52 which executes the processes in steps S72 and S76 of FIG. 9 or the CPU 52 which executes the processes in steps S72a and S76a of FIGS. 10 and 13.

The expansion processing circuit corresponds to the CPU 52 which executes the processes in steps S72a and S76a of FIG. 13. The upper-limit recovery determination time corresponds to a time determined by the upper-limit recovery threshold CRmaxth. The lower-limit recovery determination time corresponds to a time determined by the lower-limit abnormality threshold CRminth.

The estimation processing circuit corresponds to the $\alpha\beta$ conversion processing circuit M44, the induced voltage observer M46, the angle calculation processing circuit M48, and the speed calculation processing circuit M50.

At least one of the elements in the embodiments described above may be changed as follows. The reference upper-limit guard value $\Delta$Emax is not limited to that indicated in FIG. 3. For example, the reference upper-limit guard value $\Delta$Emax may be brought to the maximum value $\Delta$Emax0 stepwise when the steering torque Trqs becomes equal to or more than the first torque Trq1. Alternatively, even in the case where the steering torque Trqs is equal to or more than the second torque Trq2, for example, the reference upper-limit guard value $\Delta$Emax may be set to be large in the case where the steering torque Trqs is large, compared to a case where the steering torque Trqs is small. Alternatively, the reference upper-limit guard value ΔEmax may consistently be the maximum value ΔEmax0, for example.

In the case where the current which flows through the synchronous motor 34 is controlled so as to fall within a region between the positive side of q axis and the negative side of d axis as described in the paragraph for the phase of the current which flows through the synchronous motor 34, the reference upper-limit guard value ΔEmax may have a small value in the case where the steering torque Trqs is large, compared to a case where the steering torque Trqs is small, with the same aim as in the illustration of FIG. 3.

The reference lower-limit guard value ΔEmin is not limited to that indicated in FIG. 3. For example, the reference lower-limit guard value ΔEmin may be varied to a constant value (>0) stepwise when the steering torque Trqs is brought to the third torque Trq3. Alternatively, the reference lower-limit guard value ΔEmin may be a constant value when the steering torque Trqs is equal to or more than the third torque Trq3, for example. Alternatively, the reference lower-limit guard value ΔEmin may be a constant value irrespective of the magnitude of the steering torque Trqs, for example.

In the case where the current which flows through the synchronous motor 34 is controlled so as to fall within a region between the positive side of q axis and the negative side of d axis as described in the paragraph for the phase of the current which flows through the synchronous motor 34, the reference lower-limit guard value ΔEmin may have a negative value in the case where the steering torque Trqs is larger than the first torque Trq1 with the same aim as in the illustration of FIG. 3.

The torque-based upper-limit guard value is not limited to a constant value generated from the fluctuation upper-limit guard value ΔEmax1 irrespective of the magnitude of the steering torque Trqs. For example, in the case where the current which flows through the synchronous motor 34 is controlled so as to fall within a region between the positive side of d axis and the positive side of q axis, the fluctuation upper-limit guard value ΔEmax1 may have a large value in the case where the steering torque Trqs is large, compared to a case where the steering torque Trqs is small.

The torque-based lower-limit guard value is not limited to a constant value generated from the fluctuation lower-limit guard value ΔEmin1 irrespective of the magnitude of the steering torque Trqs. For example, in the case where the current which flows through the synchronous motor 34 is controlled so as to fall within a region between the positive side of d axis and the positive side of q axis, the fluctuation lower-limit guard value ΔEmin1 may have a large value in the case where the steering torque Trqs is large, compared to a case where the steering torque Trqs is small.

For the torque-based guarding processing circuit, in the fifth embodiment described above, only the torque-based upper-limit guard value ΔMAX is changed in the case where an abnormality in which the update amount Δθc2 is more than the reference upper-limit guard value ΔEmax is caused, and only the torque-based lower-limit guard value ΔMIN is changed in the case where an abnormality in which the update amount Δθc2 is less than the reference lower-limit guard value ΔEmin is caused. However, the present invention is not limited thereto. That is, both the processes in steps S32a and S34a may be executed in the case where the logical sum of a proposition that the upper-limit error flag Fmax is one and a proposition that the lower-limit error flag Fmin is one is true.

In the first to fourth embodiments described above, the error flag F may be set to one in the case where the logical sum of a proposition that the duration of a state in which the update amount Δθc2 is more than the reference upper-limit guard value ΔEmax is equal to or more than an abnormality determination threshold and a proposition that the duration of a state in which the update amount Δθc2 is less than the reference lower-limit guard value ΔEmin is equal to or more than the abnormality determination threshold.

In the embodiments described above, the torque-based upper-limit guard value ΔMAX and the torque-based lower-limit guard value ΔMIN are changed gradually both in the case where the update amount Δθc2 is more than the reference upper-limit guard value ΔEmax and in the case where the update amount Δθc2 is less than the reference lower-limit guard value ΔEmin. However, the present invention is not limited thereto. For example, if the reference lower-limit guard value ΔEmin is set such that it is considered that the assist torque of the synchronous motor 34 can be generated even in the case where the update amount Δθc is at the reference lower-limit guard value ΔEmin at all times, the changing process may be omitted for the torque-based lower-limit guard value ΔMIN. The reference lower-limit guard value ΔEmin at which it is considered that the assist torque of the synchronous motor 34 can be generated can be set by determining the reference lower-limit guard value ΔEmin as the larger one of a value obtained by subtracting a predetermined value from the reference update amount ΔERF and zero, for example.

For the abnormality determination, the abnormality counter may be decremented on condition that the abnormality counter is equal to or more than zero in the case where a negative determination is made in step S14 in the process in FIG. 4, for example. In the process in FIG. 11, meanwhile, the upper-limit abnormality counter CEmax may be decremented on condition that the upper-limit abnormality counter CEmax is equal to or more than zero in the case where a negative determination is made in step S12, and the lower-limit abnormality counter CEmin may be decremented on condition that the lower-limit abnormality counter CEmin is equal to or more than zero in the case where a negative determination is made in step S14.

For the upper-limit abnormality determination time and the lower-limit abnormality determination time, in the case where the current which flows through the synchronous motor 34 is controlled so as to fall within a region between the positive side of q axis and the negative side of d axis as described in the paragraph for the phase of the current which flows through the synchronous motor 34 below, it is desirable that the upper-limit abnormality threshold CEmaxth which determines the upper-limit abnormality determination time should be smaller than the lower-limit abnormality threshold CEminth which determines the lower-limit abnormality determination time.

For the recovery determination, the recovery counter CR may be decremented on condition that the recovery counter CR is equal to or more than zero in the case where a negative determination is made in step S52 of FIG. 8. Meanwhile, the upper-limit recovery counter CRmax may be decremented on condition that the upper-limit recovery counter CRmax is equal to or more than zero in the case where a negative determination is made in step S52a of FIG. 12, and the lower-limit recovery counter CRmin may be decremented on condition that the lower-limit recovery counter CRmin is equal to or more than zero in the case where a negative determination is made in step S52b.

For the upper-limit recovery determination time and the lower-limit recovery determination time, in the case where the current which flows through the synchronous motor 34 is controlled so as to fall within a region between the positive side of q axis and the negative side of d axis as described in the paragraph for the phase of the current which flows through the synchronous motor 34 below, it is desirable that the upper-limit recovery determination time (upper-limit recovery threshold CRmaxth) should be larger than the lower-limit recovery determination time (lower-limit recovery threshold CRminth).

The current control processing circuit is not limited to that described in the embodiments described above. For example, the current control processing circuit may execute model predictive control. Specifically, future currents iγ and iδ for a case where currents iγ and iδ for γ and δ axes are input and each of a plurality of switching modes is tentatively selected may be predicted, and a switching mode that makes the difference between the predicted values and the command values small may be adopted actually. Also in this case, it is effective to set the control angle θc as in the embodiments described above if the control angle θc is used as a parameter for coordinate conversion between the γδ coordinate system and the fixed coordinate system.

The control angle manipulation processing circuit is not limited to that described in the embodiments described above. For example, the update amount Δθc1 may be calculated from only a proportional element that takes the difference between the target torque Trqs* and the steering torque Trqs as an input. Alternatively, the update amount Δθc1 may be calculated from only an integral element, for example. Further, the update amount Δθc1 may be calculated using a proportional element, an integral element, and a derivative element, for example.

For the phase of the current which flows through the synchronous motor 34, it is assumed that the current which flows through the synchronous motor 34 falls within a region between the positive side of d axis and the positive side of q axis in the rotating coordinate system in the embodiments described above. However, the present invention is not limited thereto. For example, the current which flows through the synchronous motor 34 may be controlled so as to fall within a region between the positive side of q axis and the negative side of d axis. In this case, the d-axis current is negative, and therefore field weakening control is performed. Thus, torque of the synchronous motor 34 is easily generated at high rotational speeds.

In this case, it is desirable that the reference update amount ΔERF should be smaller as the steering torque Trqs is larger. In addition, it is desirable that the fluctuation upper-limit guard value ΔEmax1 should be subjected to a decrease correction using the high-speed change amount ΔEH in step S32a, and that the fluctuation lower-limit guard value ΔEmin1 should be subjected to an increase correction using the low-speed change amount ΔEL in step S34a. In this case, in addition, it is desirable that the fluctuation upper-limit guard value ΔEmax1 should be subjected to an increase correction using the low-speed change amount ΔEL and the fluctuation lower-limit guard value ΔEmin1 should be subjected to a decrease correction using the high-speed change amount ΔEH in step S72a.

The estimation processing circuit is not limited to that described in the embodiments described above. For example, the induced voltage observer may estimate induced voltages on the basis of currents in a rotating coordinate system that rotates in accordance with the estimated variation amount ω1 and command voltages in the coordinate system.

The steering control device is not limited to a steering control device that includes the CPU 52 and the memory 54 and that executes only software processes. For example, at least some of the software processes performed in the embodiments described above may be processed by dedicated hardware (ASIC). That is, the process performed by the torque-based guarding processing circuit M60 may be processed by hardware, and the CPU 52 may acquire the update amount Δθc from the hardware, for example.

The synchronous motor is not limited to an SPMSM, and may be an interior permanent magnet synchronous motor. The steering device is not limited to a steering device that includes a steering actuator of a rack-and-pinion type. For example, the steering device may include a steering actuator of a rack-cross type (registered trademark), a rack-parallel type (registered trademark), a rack-coaxial type (registered trademark), or the like.

What is claimed is:

1. A steering control device that controls a steering device that assists steering of a vehicle and that includes a synchronous motor that generates assist torque and a power conversion circuit that applies a voltage to the synchronous motor, the steering control device comprising:
    a current control processing circuit that manipulates the voltage, which is applied to the synchronous motor by the power conversion circuit, in order to control a current that flows through the synchronous motor to a command value;
    a control angle manipulation processing circuit that manipulates a control angle that determines a phase of the command value in order to control a detected value of steering torque, which is torque input to a steering member, to target torque through feedback control; and
    a torque-based guarding processing circuit that performs a guarding process such that an update amount for the control angle determined by the control angle manipulation processing circuit is equal to or less than a torque-based upper-limit guard value, which is an upper-limit guard value for a magnitude of the update amount in a rotational direction of the synchronous motor that matches the detected value, and equal to or more than a torque-based lower-limit guard value, which is a lower-limit guard value for the magnitude of the update amount in the rotational direction of the synchronous motor that matches the detected value, wherein
    the torque-based guarding processing circuit includes a contraction processing circuit that gradually contracts an allowable range of the update amount determined by the torque-based upper-limit guard value and the torque-based lower-limit guard value using, as a condition, at least one of a state in which the magnitude of the update amount is more than the torque-based upper-limit guard value and a state in which the magnitude of the update amount is less than the torque-based lower-limit guard value.

2. The steering control device according to claim 1, wherein:
    the torque-based upper-limit guard value before execution of the process in which the contraction processing circuit gradually contracts the allowable range is set to a reference upper-limit guard value;
    the torque-based lower-limit guard value before such execution is set to a reference lower-limit guard value;
    the contraction processing circuit executes at least one of a process in which the torque-based upper-limit guard value is decreased with respect to the reference upper-limit guard value on condition that the torque-based upper-limit guard value is equal to or more than a reference update amount and a process in which the torque-based lower-limit guard value is increased with respect to the reference lower-limit guard value on condition that the torque-based lower-limit guard value is equal to or less than the reference update amount; and the reference update amount is set to a value that is between the reference upper-limit guard value and the reference lower-limit guard value and that has a positive or negative correlation with the steering torque.

3. The steering control device according to claim 2, wherein the contraction processing circuit sets an absolute value of a speed at which the torque-based upper-limit guard value is decreased with respect to the reference upper-limit guard value and an absolute value of a speed at which the torque-based lower-limit guard value is increased with respect to the reference lower-limit guard value to different values.

4. The steering control device according to claim 2, wherein:

the contraction processing circuit decreases the torque-based upper-limit guard value with respect to the reference upper-limit guard value in the case where a duration of a state in which the magnitude of the update amount determined by the control angle manipulation processing circuit is more than the reference upper-limit guard value is equal to or more than an upper-limit abnormality determination time, and increases the torque-based lower-limit guard value with respect to the reference lower-limit guard value in the case where a duration of a state in which the magnitude of the update amount determined by the control angle manipulation processing circuit is less than the reference lower-limit guard value is equal to or more than a lower-limit abnormality determination time; and the lower-limit abnormality determination time and the upper-limit abnormality determination time are set to different values.

5. The steering control device according to claim 2, wherein the torque-based guarding processing circuit includes an expansion processing circuit that expands a width between the torque-based upper-limit guard value and the torque-based lower-limit guard value on condition that the update amount for the control angle determined by the control angle manipulation processing circuit is between the reference upper-limit guard value and the reference lower-limit guard value and an allowable range determined by the torque-based upper-limit guard value and the torque-based lower-limit guard value is narrower than an allowable range determined by the reference upper-limit guard value and the reference lower-limit guard value.

6. The steering control device according to claim 5, wherein the expansion processing circuit increases the torque-based upper-limit guard value in a range in which the torque-based upper-limit guard value is equal to or less than the reference upper-limit guard value on condition that the magnitude of the update amount determined by the control angle manipulation processing circuit is equal to or less than the reference upper-limit guard value, and decreases the torque-based lower-limit guard value in a range in which the torque-based lower-limit guard value is equal to or more than the reference lower-limit guard value on condition that the magnitude of the update amount determined by the control angle manipulation processing circuit is equal to or more than the reference lower-limit guard value; and an absolute value of a speed at which the torque-based upper-limit guard value is increased and an absolute value of a speed at which the torque-based lower-limit guard value is decreased are set to different values.

7. The steering control device according to claim 6, wherein the expansion processing circuit increases the torque-based upper-limit guard value in a range in which the torque-based upper-limit guard value is equal to or less than the reference upper-limit guard value in the case where a duration of a state in which the magnitude of the update amount determined by the control angle manipulation processing circuit is equal to or less than the reference upper-limit guard value is equal to or more than an upper-limit recovery determination time, and decreases the torque-based lower-limit guard value in a range in which the torque-based lower-limit guard value is equal to or more than the reference lower-limit guard value in the case where a duration of a state in which the magnitude of the update amount determined by the control angle manipulation processing circuit is equal to or more than the reference lower-limit guard value is equal to or more than a lower-limit recovery determination time; and the upper-limit recovery determination time and the lower-limit recovery determination time are set to different values.

8. The steering control device according to claim 1, further comprising:

an estimation processing circuit that estimates an induced voltage on the basis of the current which flows through the synchronous motor and the voltage which is applied to terminals of the synchronous motor, and that calculates an estimated variation amount which is an amount of rotation of the synchronous motor per predetermined time on the basis of the estimated induced voltage; and a variation amount-based guarding processing circuit that performs a guarding process on the update amount for the control angle determined by the control angle manipulation processing circuit using a variation amount-based upper-limit guard value, which is an upper-limit guard value that matches the estimated variation amount, and a variation amount-based lower-limit guard value, which is a lower-limit guard value that matches the estimated variation amount, wherein the torque-based guarding processing circuit performs the guarding process on the update amount which has been subjected to the guarding process which is performed by the variation amount-based guarding processing circuit.

* * * * *